US012591401B2

(12) United States Patent
Narushima

(10) Patent No.: US 12,591,401 B2
(45) Date of Patent: Mar. 31, 2026

(54) MOBILE TERMINAL, INFORMATION PROCESSING DEVICE AND INFORMATION PROCESSING METHOD

(71) Applicant: MICWARE CO., LTD., Kobe (JP)

(72) Inventor: Kenji Narushima, Kobe (JP)

(73) Assignee: MICWARE CO., LTD., Kobe (JP)

( * ) Notice: Subject to any disclaimer, the term of this patent is extended or adjusted under 35 U.S.C. 154(b) by 0 days.

(21) Appl. No.: 19/242,974

(22) Filed: Jun. 19, 2025

(65) Prior Publication Data

US 2025/0348262 A1 Nov. 13, 2025

Related U.S. Application Data

(63) Continuation of application No. PCT/JP2022/047550, filed on Dec. 23, 2022.

(51) Int. Cl.
*G06F 3/14* (2006.01)
*G06T 5/50* (2006.01)

(52) U.S. Cl.
CPC .................. *G06F 3/14* (2013.01); *G06T 5/50* (2013.01); *G06T 2207/20221* (2013.01)

(58) Field of Classification Search
CPC .... G06F 3/14; G06T 5/50; G06T 2207/20221
USPC ...................................... 348/231.6
See application file for complete search history.

(56) References Cited

U.S. PATENT DOCUMENTS

| | | | |
|---|---|---|---|
| 11,663,916 B2 * | 5/2023 | Gruteser | B60Q 9/004 |
| | | | 340/932.2 |
| 2016/0155474 A1 | 6/2016 | Hanaya et al. | |
| 2021/0158632 A1 | 5/2021 | Nishiyama et al. | |

FOREIGN PATENT DOCUMENTS

| | | |
|---|---|---|
| EP | 2827259 A | 1/2015 |
| JP | 2007-67487 A | 3/2007 |
| JP | 2014-127987 A | 7/2014 |
| JP | 2016-134859 A | 7/2016 |
| JP | 2021-83034 A | 5/2021 |
| KR | 10-2115098 B | 5/2020 |

OTHER PUBLICATIONS

Japanese Notice of Reasons for Refusal dated May 12, 2025.
Japanese decision to grant a patent dated May 22, 2025.

* cited by examiner

*Primary Examiner* — Joel W Fosselman
(74) *Attorney, Agent, or Firm* — Yokoi & Co., U.S.A.; Toshiyuki Yokoi

(57) ABSTRACT

A mobile terminal 5 includes: a position obtainer 231 configured to obtain a relative position information for identifying a relative position of the mobile terminal 5 in an indoor environment; an image capturer 232 configured to capture a video; a generator 234 configured to obtain an additional video by associating the relative position information or an absolute position information obtained by using the relative position information with the video; and a video output unit 251 configured to output the additional video. Thus, the video captured by the mobile terminal moving in the indoor environment can be appropriately utilized.

3 Claims, 20 Drawing Sheets

Fig. 14

| ID | terminal identifier | positional information | | terminal communication information |
|---|---|---|---|---|
| | | area identifier | detailed position | |
| 1 | T001 | underground mall A | $(x_1, y_1)$ | destination 1 |
| 2 | T002 | underground mall A | $(x_2, y_2)$ | destination 2 |
| 3 | T003 | building B | $(x_3, y_3)$ | destination 3 |
| 4 | T004 | building B | $(x_4, y_4)$ | destination 4 |
| 5 | T005 | — | $(X_5, Y_5, H_5)$ | destination 5 |
| ⋮ | ⋮ | ⋮ | ⋮ | ⋮ |

MOBILE TERMINAL, INFORMATION PROCESSING DEVICE AND INFORMATION PROCESSING METHOD

CROSS-REFERENCE TO RELATED APPLICATIONS

This application claims the benefit of priority and is a Continuation application of the prior International Patent Application No. PCT/JP2022/047550, with an international filing date of Dec. 23, 2022, which designated the United States, the entire disclosures of all applications are expressly incorporated by reference in their entirety herein.

TECHNICAL FIELD

The present invention relates to a mobile terminal and the like configured to capture a video while moving in an indoor environment.

BACKGROUND OF THE INVENTION

Conventionally, there is a technology for providing image data of a vehicle-mounted camera captured at the location and in the environment desired by a user (e.g., shown in Patent Document 1).

PRIOR ART

Patent Documents

Patent Document 1: Japanese Patent Publication No. 2021-83034

SUMMARY OF THE INVENTION

Problem to be Solved by the Invention

However, in the conventional technology, it is impossible to appropriately utilize the video captured by the mobile terminal moving in an indoor environment.

Means for Solving the Problems

A mobile terminal of the first aspect of the present invention is the mobile terminal including a position obtainer configured to obtain a relative position information for identifying a relative position of the mobile terminal in an indoor environment; an image capturer configured to capture a video; a generator configured to obtain an additional video by associating the relative position information or an absolute position information obtained by using the relative position information with the video; and a video output unit configured to output the additional video.

The above described configuration allows to provide the mobile terminal configured to move in the indoor environment and capture the video which can be appropriately utilized.

A mobile terminal of the second aspect of the present invention is the mobile terminal according to the first aspect, further including an attribute value obtainer configured to obtain one or more camera attribute values including a direction information indicating a direction of capturing the video by the image capturer, wherein the generator is configured to obtain the additional video in which the one or more camera attribute values obtained by the attribute value obtainer are also associated with the video.

The above described configuration allows to provide the video captured while moving in the indoor environment.

A mobile terminal of the third aspect of the present invention is the mobile terminal according to the first or the second aspect, wherein the position obtainer includes an absolute position obtainer configured to obtain the absolute position information of the mobile terminal and a relative position obtainer configured to obtain a relative position information when the absolute position information cannot be obtained.

The above described configuration allows to provide the video captured while moving in the indoor environment.

A mobile terminal of the fourth aspect of the present invention is the mobile terminal according to any one of the first to third aspects, further including: a position transmitter configured to transmit the positional information, which is the relative position information or the absolute position information obtained by using the relative position information, to an information processing device; a mobile instruction receiver configured to receive a transmission instruction from the information processing device; and a mobile video transmitter configured to transmit the video when the transmission instruction is received.

The above described configuration allows to provide the video captured while moving in the indoor environment.

A mobile terminal of the fifth aspect of the present invention is the mobile terminal according to any one of the first to third aspects, further including: a mobile inquiry receiver configured to receive an inquiry including a location identification information for identifying a location in the indoor environment; a mobile determination unit configured to determine whether or not the relative position information or the absolute position information obtained by using the relative position information satisfies the inquiry; and a mobile video transmitter configured to transmit the video when the mobile determination unit determines that the relative position information or the absolute position information satisfies the inquiry.

The above described configuration allows to provide the video captured while moving in the indoor environment.

An information processing device of the sixth aspect of the present invention is the information processing device including: an inquiry receiver configured to receive an inquiry including a location identification information for identifying a location in an indoor environment from a user terminal; a video obtainer configured to obtain the video transmitted from the mobile terminal moving in the indoor environment, the video satisfying the inquiry; and a video transmitter configured to transmit the video to the user terminal.

The above described configuration allows to provide a platform capable of utilizing the video captured by the mobile terminal appropriately.

An information processing device of the seventh aspect of the present invention is the information processing device according to the sixth aspect, further including: a terminal manager configured to store a terminal information including a positional information for identifying a position of the mobile terminal while being associated with each of one or more mobile terminals; a position receiver configured to receive a positional information, which is a relative position information or an absolute position information obtained by using the relative position information, from each of the one or more mobile terminals; a position accumulator configured to accumulate the positional information in the terminal manager while being associated with the mobile terminal; and a terminal determination unit configured to determine the mobile terminal corresponding to the positional information associated with the location identified by the location identification information included in the inquiry, wherein the video obtainer is configured to obtain the video captured by the mobile terminal determined by the terminal determination unit.

The above described configuration allows to provide a platform capable of utilizing the video captured by the mobile terminal appropriately.

An information processing device of the eighth aspect of the present invention is the information processing device according to the sixth aspect, further including: a terminal manager configured to store a terminal information which is an information of the mobile terminal while being associated with each of one or more mobile terminals; and an inquiry transmitter configured to transmit the inquiry to each of the one or more mobile terminals, wherein the video obtainer is configured to receive the video from the mobile terminal when the inquiry is transmitted.

The above described configuration allows to provide a platform capable of utilizing the video captured by the mobile terminal appropriately.

An information processing device of the ninth aspect of the present invention is the information processing device according to any one of the sixth to eighth aspects, wherein the video obtainer further includes a video generator configured to obtain the video captured by each of the plurality of mobile terminals and generate one video by combining each of a plurality of videos obtained by the video obtainer in a time series manner or merging the plurality of videos obtained by the video obtainer in a spatial manner, wherein the video transmitter is configured to transmit the video generated by the video generator to the user terminal.

The above described configuration allows to provide a platform capable of utilizing the video captured by the mobile terminal appropriately.

An information processing device of the tenth aspect of the present invention is the information processing device according to any one of the sixth to ninth aspects, wherein the video obtained by the video obtainer is associated with a right holder identifier for identifying a right holder of the video, and a right holder processor is further provided for performing a right holder process which is a process related to the right holder associated with the right holder identifier associated with the video.

The above described configuration allows to perform an appropriate process related to the right holder of the video.

An information processing device of the eleventh aspect of the present invention is the information processing device according to the tenth aspect, wherein the right holder processor further includes a rewarding unit for performing a rewarding process for giving a reward to each of the right holder identified by the right holder identifier.

The above described configuration allows to give the reward to the right holder of the video captured by the mobile terminal.

An information processing device of the twelfth aspect of the present invention is the information processing device according to the eleventh aspect, wherein the rewarding unit is configured to perform the rewarding process which is the process of determining the reward to the right holder using a video attribute value associated with the video and giving the reward.

The above described configuration allows to give an appropriate reward to the right holder of the video captured by the mobile terminal.

An information processing device of the thirteenth aspect of the present invention is the information processing device according to the tenth aspect, wherein the right holder processor includes a first preservation unit configured to perform a first preservation process for accumulating the video while being associated with an attribute value set corresponding to the video.

The above described configuration allows to preserve the video.

An information processing device of the fourteenth aspect of the present invention is the information processing device according to the tenth aspect, wherein the right holder processor includes a second preserver configured to perform a second preservation process for accumulating the video while being associated with a right holder identifier corresponding to the video.

The above described configuration allows to set an appropriate right holder as the right holder of the video.

An information processing device of the fifteenth aspect of the present invention is the information processing device according to the tenth aspect, wherein the right holder processor includes a third preserver configured to accumulate the video while being associated with a right holder identifier for identifying a user of the user terminal.

The above described configuration allows to set a user requiring the video as the right holder of the video.

An information processing device of the sixteenth aspect of the present invention is the information processing device according to any one of the thirteenth to fifteenth aspect, wherein the right holder processor includes a fourth preservation unit configured to perform a fourth preservation process which is the process of accumulating a preservation information including an access information for accessing the video in a blockchain.

The above described configuration allows to preserve the management information of the video requiring the preservation.

Effects of the Invention

The information processing device of the present invention allows to appropriately provide the video captured during moving in the indoor environment.

BRIEF DESCRIPTION OF DRAWINGS

FIG. 14 is a drawing showing a terminal management table in the first embodiment.

DETAILED DESCRIPTION OF THE INVENTION

Figure 1:
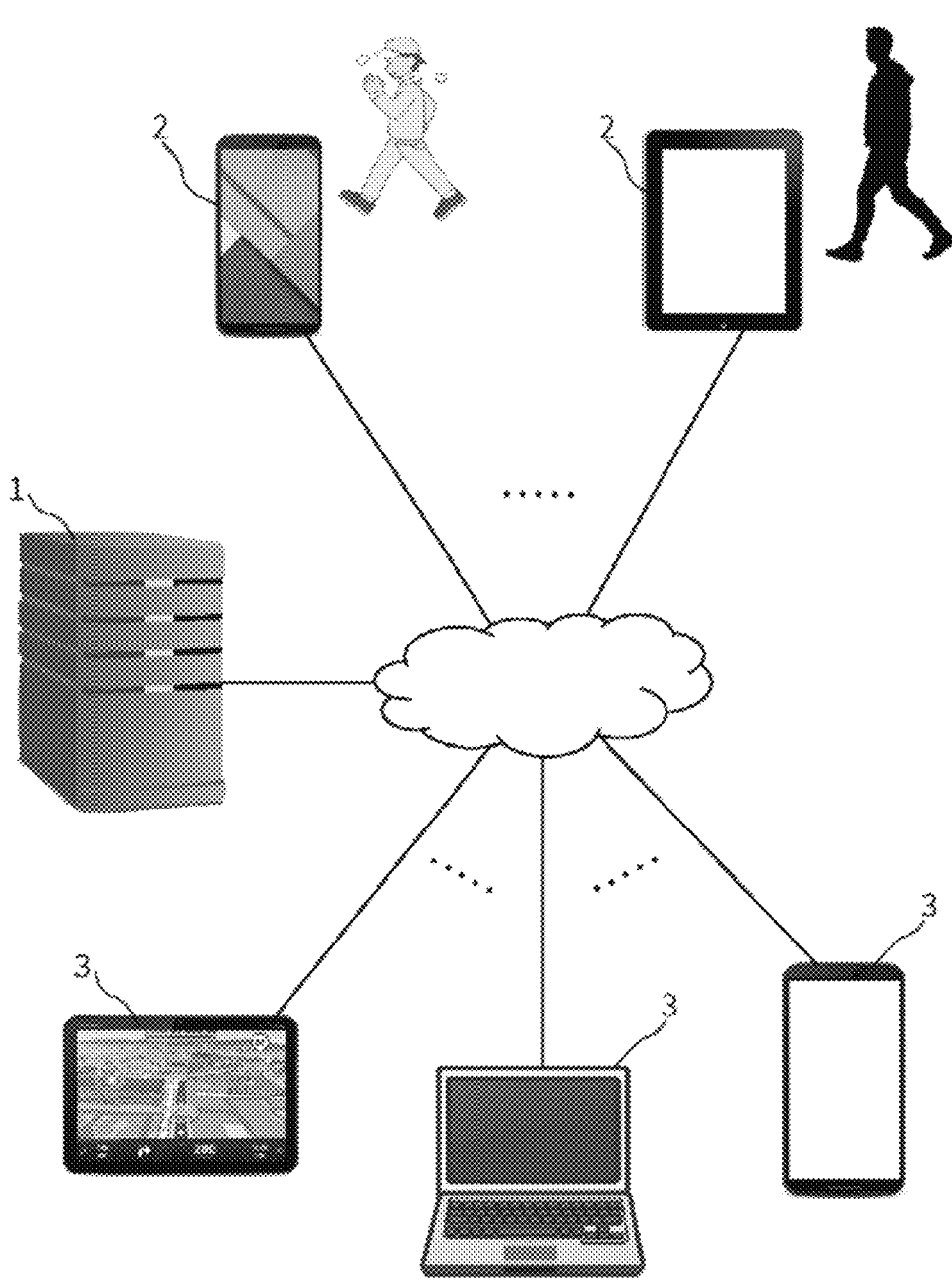
FIG. 1 is a schematic diagram of an information system A in the first embodiment.

Hereafter, embodiments of a mobile terminal and other configurations will be explained with reference to the drawings. The repeated explanation of the components denoted with the same reference numerals may be omitted in the embodiments since the operations are the same.

First Embodiment

Outline of First Embodiment

The present embodiment explains a mobile terminal configured to obtain a relative position information of the mobile terminal in an indoor environment and outputs a captured video and the relative position information while being associated with each other.

The present embodiment also explains a mobile terminal for also outputting one or more camera attribute values including a direction information indicating a capturing direction while being associated with the video.

The present embodiment also explains a mobile terminal for obtaining the relative position information and outputting the relative position information while being associated with the captured video when the absolute position information cannot be obtained.

The present embodiment also explains a mobile terminal for transmitting the obtained positional information to an information processing device and transmitting the captured video to the information processing device when the transmission instruction is received from the information processing device.

The present embodiment also explains an information processing device for determining a mobile terminal capturing a video corresponding to an inquiry received from a user terminal using a positional information received from the mobile terminal, instructing the mobile terminal to transmit the video, receiving the video from the mobile terminal and transmitting the video to the user terminal from which the inquiry is transmitted.

The present embodiment also explains an information processing device for sequentially transmitting the videos received from a plurality of mobile terminals 2 to the user terminal.

The present embodiment also explains an information processing device for generating one video by combining the videos received from a plurality of mobile terminals 2 in a time series manner or merging the videos in a spatial manner and transmitting the one video to the user terminal.

The present embodiment further explains an information processing device for performing a right holder process which is the process related to a right holder of the video to be outputted. The right holder process is, for example, the later described rewarding process and the later described various kinds of preservation processes.

In the present specification, the fact that information X is associated with the information Y means that the information Y can be obtained from the information X or that the information X can be obtained from the information Y. The information X may be associated with the information Y in any manner. The information X and the information Y may be linked with each other or may be in the same buffer. The information X may be included in the information Y. The information Y may be included in the information X.

<Outline of Information System A>

FIG. 1 is a schematic diagram of an information system A in the present embodiment. The information system A includes an information processing device 1, one or a plurality of mobile terminals 2 and one or a plurality of user terminals 3.

The information processing device 1 is the server for providing the video transmitted by each of one or a plurality of mobile terminals 2 to the user terminal 3. The information processing device 1 is, for example, a so-called server such as a cloud server and an application service provider (ASP) server. The type of the information processing device 1 is not limited. The information processing device 1 may be a device included in a blockchain.

In the present specification, the interval of the capturing time between a plurality of still images included in the video is not limited. The video includes 60 frames per second or 30 frames per second, for example. However, the video may be a set of a plurality of still images captured at an interval equal to or longer than a predetermined time (e.g., one minute) or a set of a plurality of still images captured when a predetermined condition is satisfied.

The mobile terminal 2 is a movable terminal. The mobile terminal 2 is the terminal installed on a mobile body for capturing the video. The mobile terminal 2 is, for example, a smartphone, a tablet terminal, a camera with a communication function, glasses with a camera or a smartwatch with a camera. The installation normally means the condition where something is fastened. However, it is also possible to consider that the installation includes the situation where something is contacted or held. The movable body is an object that moves. The movable body is, for example, a device that moves underground or a living thing. The living thing is normally a human. However, the living thing may be a dog, a cat or other living things.

The user terminal 3 is a terminal used by a user. The user is a person who views the video or a person who requires the video. The user terminal 3 may have the function of the mobile terminal 2. Namely, the user terminal 3 may be the terminal of the user providing the video. The user terminal 3 is, for example, a smartphone, a tablet terminal, a so-called personal computer, a navigation terminal or the like. The type of the user terminal 3 is not limited.

The information processing device 1 and each of one or more mobile terminals 2 can generally communicate with each other through a network such as the Internet. The information processing device 1 and each of one or more user terminals 3 can generally communicate with each other through a network such as the Internet.

Figure 2:
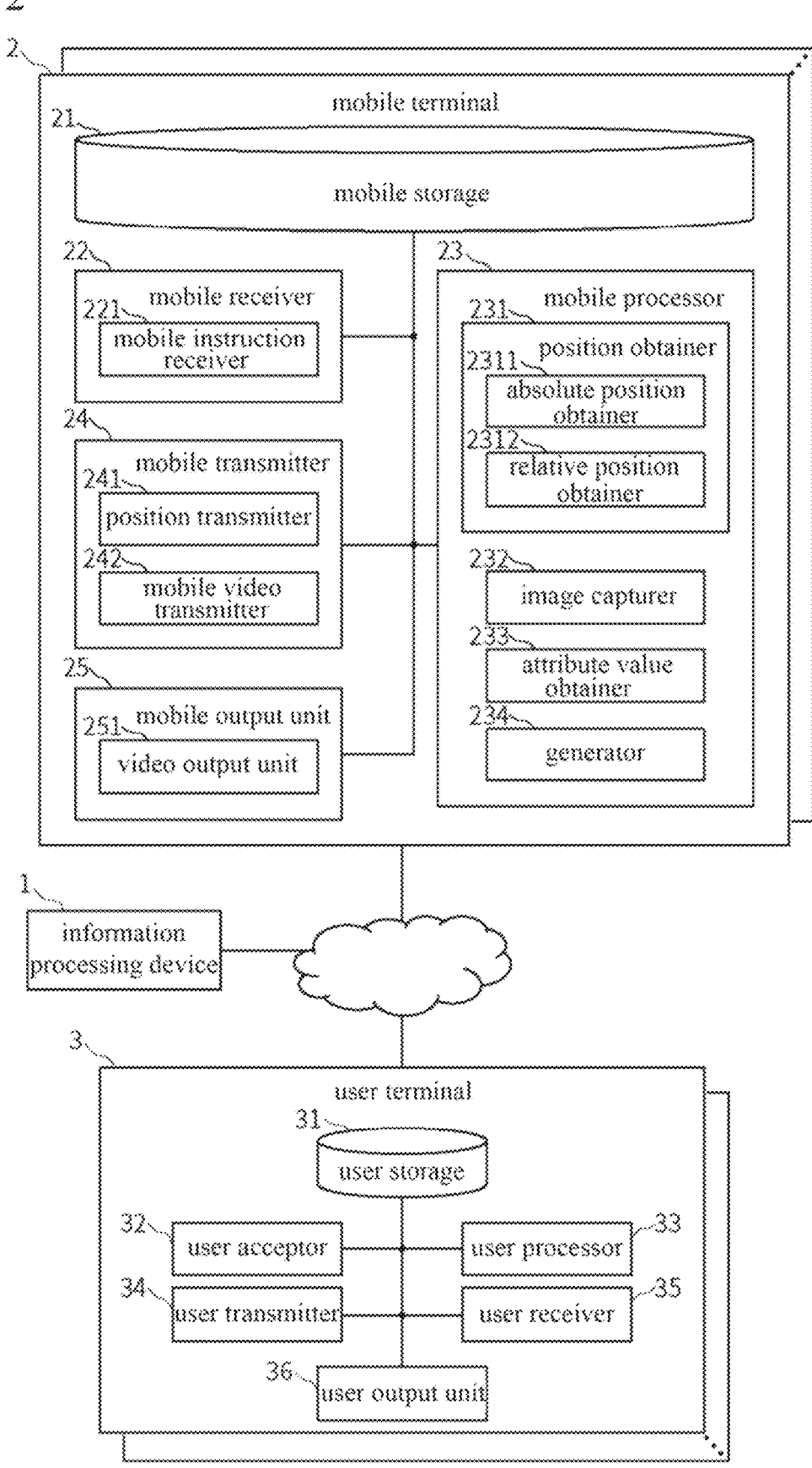
FIG. 2 is a block diagram of the information system A in the first embodiment.
Figure 3:
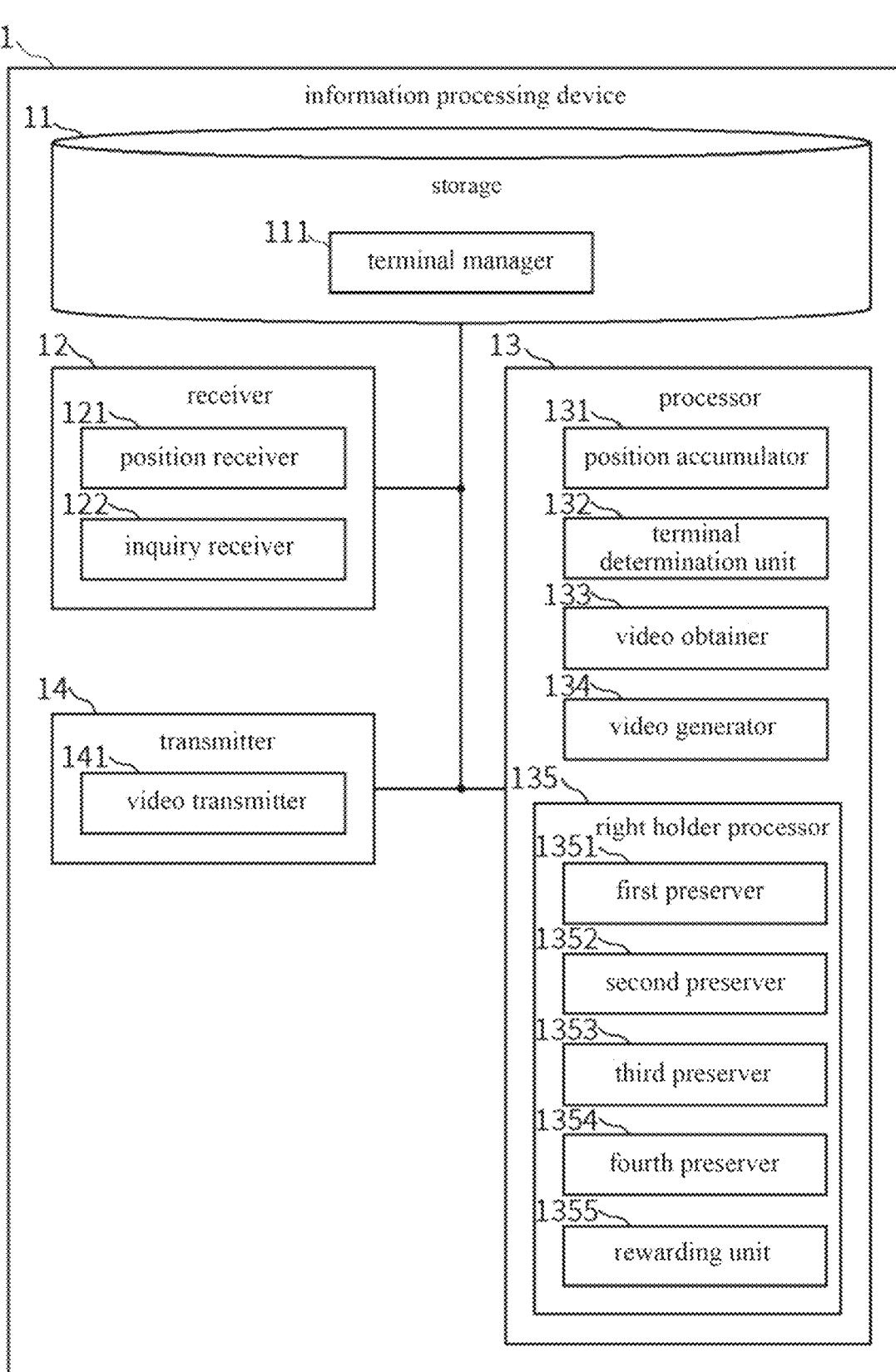
FIG. 3 is a block diagram of an information processing device 1 in the first embodiment.

FIG. 2 is a block diagram of the information system A in the present embodiment. FIG. 3 is a block diagram of the information processing device 1.

The information processing device 1 includes a storage (storage unit) 11, a receiver (reception unit) 12, a processor (processing unit) 13 and a transmitter (transmission unit) 14. The storage 11 includes a terminal manager (terminal management unit) 111. The receiver 12 includes a position receiver (position reception unit) 121 and an inquiry receiver (inquiry reception unit) 122. The processor 13 includes a position accumulator (position accumulation unit) 131, a terminal determination unit 132, a video obtainer (video obtaining unit) 133, a video generator (video generation unit) 134 and a right holder processor (right holder processing unit) 135. The right holder processor 135 includes a first preserver (first preservation unit) 1351, a second preserver (second preservation unit) 1352, a third preserver (third preservation unit) 1353, a fourth preserver (fourth preservation unit) 1354 and a rewarding unit 1355. The transmitter 14 includes a video transmitter 141.

The mobile terminal 2 includes a mobile storage (mobile storage unit) 21, a mobile receiver (mobile reception unit) 22, a mobile processor (mobile processing unit) 23, a mobile transmitter (mobile transmission unit) 24 and a mobile output unit 25. The mobile receiver 22 includes a mobile instruction receiver (mobile instruction reception unit) 221. The mobile processor 23 includes a position obtainer (position obtaining unit) 231, an image capturer (image capturing unit) 232, an attribute value obtainer (attribute value obtaining unit) 233 and a generator (generation unit) 234. The position obtainer 231 includes an absolute position obtainer (absolute position obtaining unit) 2311 and a relative position obtainer (relative position obtaining unit) 2312. The mobile transmitter 24 includes a position transmitter (position transmission unit) 241 and a mobile video transmitter (mobile video transmission unit) 242. The mobile output unit 25 includes a video output unit 251.

The user terminal 3 includes a user storage (user storage unit) 31, a user acceptor (user acceptance unit) 32, a user processor (user processing unit) 33, a user transmitter (user transmission unit) 34, a user receiver (user reception unit) 35 and a user output unit 36.

<Detail of Components of Information Processing Device 1>

The storage 11 stores various kinds of information. The various kinds of information are, for example, the later described terminal information, the video and the video attribute value associated with the video.

The video attribute value is an attribute value of the video. The video attribute value is, for example, an environment information. The environment information is the information about the environment where the video is captured. The environment information is, for example, the later described positional information, time information, weather information, temperature information or season information. The time information is the information for identifying the time when the video is captured. The time when the video is captured may be the time around the time when the video is captured. The accuracy is not required for the time when the video is captured. The time information is, for example, a time, a set of year, month, day and hour, a set of year, month, day, hour and minute, a set of year, month, day, hour, minute and second, a set of year, month and day or a set of month and day. Namely, the time information may indicate the time with any granularity. The weather information is the information for identifying the weather at the location (or region) where the video is captured and at the time when the video is captured. The weather information is, for example, "sunny," "rainy," "snowy" or "cloudy." The temperature information is the information for identifying a temperature at the location where the video is captured and at the time when the video is captured. The temperature information is, for example, "25 degrees" or "30 degrees or higher." The season information is the information for identifying the season at the location where the video is captured and at the time when the video is captured. The season information is, for example, "spring," "summer," "early summer" or "winter."

The terminal manager 111 stores one or a plurality of terminal information. The terminal information is associated with the mobile terminal 2. The terminal information is the information related to the mobile terminal 2. The terminal information here normally includes a terminal identifier which is the identifier of the mobile terminal 2, a positional information and a terminal communication information. The mobile terminal 2 here is normally the terminal capable of transmitting the video.

The terminal identifier is the information for identifying the mobile terminal 2. The terminal identifier may be the right holder identifier for identifying the right holder which is the user of the mobile terminal 2. The terminal identifier is, for example, an identification (ID) of the mobile terminal 2, a user identifier of the user of the mobile terminal 2, a name of the mobile terminal 2, an IP address of the mobile terminal 2 or a media access control (MAC) address of the mobile terminal 2.

The right holder is a person having any right about the video captured by the mobile terminal 2. The right holder is, for example, an owner of the video, a copyright holder of the video, an owner of the mobile terminal 2 capturing the video or an authority with disposal rights of the video. The right holder is, for example, an initial right holder of the video. Although the right holder is normally the owner of the mobile terminal 2, the right holder may be any person who has the right of the video captured by the mobile terminal 2.

The right holder identifier may be the terminal identifier. The right holder identifier is, for example, an identification (ID) of the right holder, a name of the right holder, a mail address of the right holder or a telephone number of the right holder. The ID of the right holder is, for example, a user identifier.

The positional information is the information for identifying the position of the mobile terminal 2. The positional information is, for example, the absolute position information of the mobile terminal 2 or the relative position information of the mobile terminal 2. The absolute position information is, for example, a set of a latitude and a longitude or a set of a latitude, a longitude and an altitude. The relative position information is the information for identifying a relative position with respect to a reference point. The relative position information is, for example, the information for identifying a relative position in the indoor environment. The relative position information is, for example, the relative position in an indoor environment or a set of an area identifier and the relative position in the indoor environment. The relative position in the indoor environment is, for example, (x-coordinate value, y-coordinate value) relative to the reference point (0, 0) and (x-coordinate value, y-coordinate value, h-coordinate value) relative to the reference point (0, 0, 0). The h-coordinate value corresponds to the altitude (height).

The area identifier is the information for identifying the area corresponding to the relative position information. Note that the area typically has a spatial extent. However, the area may be one location. The area identifier is an identification (ID) in the indoor area or a name (hereafter, referred to appropriately as area name) in the indoor area. The area name is, for example, a name of an underground mall, a name of a station concourse, a name of a building or a name of a street.

The terminal communication information is the information for communicating with the mobile terminal 2. The terminal communication information is, for example, an IP address of the mobile terminal 2, a media access control (MAC) address of the mobile terminal 2 or an identification (ID) of a communication application installed in the mobile terminal 2.

The receiver 12 receives various kinds of information and instructions from the mobile terminal 2 or the user terminal 3. The various kinds of information and instructions are, for example, the positional information, the inquiry, the video and the later described additional video.

The receiver 12 may receive the video from each of one or a plurality of mobile terminals 2 while being paired with the positional information. In the above described case, it is preferable for the receiver 12 to receive the video continuously. To receive the video continuously is, for example, to receive the video periodically or receive the video all of the time. The concept of "periodically" may include certain difference of the intervals.

The position receiver 121 receives the positional information from each of one or a plurality of mobile terminals 2. The positional information is the information for specifying the position of the mobile terminal 2. The positional information received by the position receiver 121 is, for example, the relative position information a set of the area identifier and the relative position information or the absolute position information obtained by using the relative position information. The position receiver 121 normally receives the positional information while being paired with the terminal identifier.

It is preferred that the position receiver 121 continuously receives the latest positional information from one or a plurality of mobile terminals 2.

The inquiry receiver 122 receives the inquiry from each of one or a plurality of user terminal 3. It can be said that the inquiry is the instruction for transmitting the video. The inquiry includes a location identification information. The inquiry may include the absolute position information. The inquiry may include one or more dynamic attribute values. Note that the one or more dynamic attribute values included in the inquiry normally generate the condition joined by AND.

The location identification information is the information for identifying the location in the indoor environment. The location identification information is, for example, the relative position information of the indoor store or the name of the indoor store. The location identification information includes, for example, the location name. The location identification information may be, for example, WHAT3WORDS (registered trademark) capable of identifying the location by three arbitrary words including a floor identifier identifying the floor of the building. The floor identifier is the information for identifying the floor of the building, the underground mall or the like. The location name is the name of the location. The location name is, for example, the store name, the place used for meeting someone, the name of a predetermined product or the street name.

The location identification information is, for example, a floor identifier. The floor identifier is the information for identifying the floor. The floor identifier is, for example, "third floor," "basement," "second basement (B2)" or "rooftop."

The processor 13 performs various kinds of processes. For example, the various kinds of processes are performed by the position accumulator 131, the terminal determination unit 132, the video obtainer 133, the video generator 134 or the right holder processor 135.

The processor 13 may accumulate the video continuously received by the receiver 12 while being associated with the positional information and the terminal identifier.

The position accumulator 131 accumulates the positional information received by the position receiver 121 from the mobile terminal 2 in the terminal manager 111 while being associated with the mobile terminal 2. For example, the position accumulator 131 accumulates the positional information in the terminal manager 111 while being paired with the terminal identifier.

The terminal determination unit 132 determines one or a plurality of mobile terminals 2 corresponding to the positional information corresponding to the location identified by the location identification information included in the received inquiry.

The terminal determination unit 132 may determine one or more mobile terminals 2 corresponding to the positional information corresponding to the absolute position information included in the received inquiry.

For example, the terminal determination unit 132 determines one or a plurality of mobile terminals 2 corresponding to the positional information satisfying an approximate condition with respect to the location identification information included in the inquiry. The above described positional information is preferably the latest positional information of each of the mobile terminals 2 in the terminal manager 111. The approximate condition means that the two positions are close to each other. The approximate condition is, for example, the condition that the position identified by the location identification information and the position indicated by the positional information are close to each other. The approximate condition is, for example, the condition that the distance between the position identified by the location identification information and the position indicated by the positional information is within a threshold value or less than the threshold value. Although the distance normally means the physical separation, the distance may be based on the travel time.

For example, the terminal determination unit 132 determines the mobile terminal 2 as follows in accordance with the structure or the content of the location identification information.

(1) When Location Identification Information Includes Location Name

For example, the terminal determination unit 132 refers to a location name database and obtains the relative position information corresponding to the location name included in the inquiry. Then, the terminal determination unit 132 determines, for example, one or a plurality of mobile terminals 2 corresponding to the relative position information satisfying the approximate condition with respect to the position indicated by the relative position information.

In the above described case, the location name database is stored in the storage 11 or another external device. In the above described case, the positional information received by the position receiver 121 is the relative position information. Note that the location name database includes one or more sets of the location name and the relative position information. The location name database may include one or more sets of the area identifier, the location name and the relative position information. The location name database may include one or more sets of the area identifier, the floor identifier, the location name and the relative position information.

(2) When Location Identification Information Includes Area Identifier and Relative Position Information For example, the terminal determination unit 132 determines one or a plurality of mobile terminals 2 corresponding to the positional information corresponding to the area identifier included in the inquiry and satisfying the approximate condition with respect to the relative position information included in the inquiry. In the above described case, the positional information received by the position receiver 121 is the area identifier and the relative position information.

(3) When Location Identification Information Includes Area Identifier, Floor Identifier and Location Name For example, the terminal determination unit 132 refers to the location name database and obtains the relative position information corresponding to the location name included in the inquiry. Note that the above described relative position information is the information for identifying the relative position on the floor identified by the floor identifier in the area identified by the area identifier. For example, the terminal determination unit 132 determines one or more mobile terminals 2 corresponding to the area identifier included in the inquiry, corresponding to the floor identifier included in the inquiry and corresponding to the positional information satisfying the approximate condition with respect to the obtained relative position information. In the above described case, the positional information received by the position receiver 121 is the area identifier, the floor identifier and the relative position information.

(4) when Location Identification Information Includes Absolute Position Information For example, the position accumulator 131 obtains the absolute position information corresponding to the received relative position information from the relative position information received by the position receiver 121 for each of the mobile terminals 2 using the absolute position information of the reference point corresponding to the relative position information. The position accumulator 131 accumulates the obtained absolute position information in the terminal manager 111 while being paired with the terminal identifier of the mobile terminal 2. Through the above described process, the absolute position information indicating the latest position of each of one or more mobile terminals 2 is stored in the terminal manager 111.

For example, the terminal determination unit 132 refers to the terminal manager 111 and determines one or a plurality of mobile terminals 2 corresponding to the absolute position information satisfying the approximate condition with respect to the absolute position information included in the inquiry.

The video obtainer 133 obtains the video transmitted from the mobile terminal 2 moving indoors, the video corresponding to the inquiry.

The video obtainer 133 may obtain the video captured by each of a plurality of mobile terminals 2. For example, the video obtainer 133 receives the video corresponding to the inquiry from one mobile terminal 2. When the one mobile terminal 2 moves and the inquiry is not satisfied, the video obtainer 133 receives the video satisfying the inquiry from another mobile terminal 2.

For example, the video obtainer 133 obtains the video captured by the mobile terminal 2 determined by the terminal determination unit 132. For example, the video obtainer 133 obtains the terminal communication information corresponding to each of one or more mobile terminals determined by the terminal determination unit 132 from the terminal manager 111. Then, the video obtainer 133 transmits the transmission instruction to the mobile terminal 2 corresponding to each of one or more terminal communication information, for example. Then, the video obtainer 133 receives the video from each of one or more mobile terminals 2 when the transmission instruction is transmitted. Note that the transmission instruction may be transmitted by the transmitter 14. The video may be received by the receiver 12. The transmission instruction is the instruction for transmitting the captured video.

For example, the video obtainer 133 obtains the video paired with the terminal identifier of the mobile terminal 2 determined by the terminal determination unit 132 from the storage 11. In the above described case, the mobile terminal 2 continuously transmits the captured videos to the information processing device 1.

For example, the video generator 134 combines each of a plurality of videos obtained by the video obtainer 133 in a time series manner to generate one video. Note that the one video combined in a time series manner is the video generated by connecting a plurality of source videos. The times when the plurality of source videos, which are the source of the one video combined in a time series manner, are preferably continued in a time series manner. However, the plurality of source videos may be separated from each other in a time series manner. For example, it is possible that the time when one video which is the source of one combined video is captured at 8:20 and another video which is the source of one combined video is captured at 8:25. The one video combined in a time series manner is appropriately referred to as a combined video.

In addition, the video generator 134 generates, for example, one video by merging each of a plurality of videos obtained by the video obtainer 133 in a spatial manner. The one video merged in a spatial manner is the video generated by constituting frames using a part or an entire of frames of each of the source videos and connecting the frames in a time series manner. Note that at least one frame constituting the one video is the frame including a part or an entire of the frames of each of the source videos. The one video merged in a spatial manner is appropriately referred to as a merged video.

The video generator 134 may perform the process of transmitting the one video obtained by the video obtainer 133 to the video transmitter 141. It can be considered that the above described process is also the process of generating the one video. The process of transmitting the one video to the video transmitter 141 is normally the process of sequentially arranging the video in a buffer for transmitting the video.

For example, the video generator 134 generates the one video by combining each of a plurality of videos obtained by the video obtainer 133 in the order of the time information associated with the video. For example, the video generator 134 obtains a part of each of a plurality of videos obtained by the video obtainer 133 to generate the one video. The operation of combining each of a plurality of videos in a time series manner is normally the operation of sequentially combining a part of the videos captured by each of a plurality of mobile terminals 2. The operation of sequentially connecting a part of the videos may be the operation of sequentially providing a part of the videos to the video transmitter 141. The operation of connecting the videos in the order of the time associated with the video is the operation of connecting the videos in the order of the time indicated in the time information associated with the video or the operation of sequentially connecting the videos in the order of the time when the video is received. It is enough if the video is viewed as one video for the user when the operation of combining a plurality of videos in a time series manner and generating one video is performed.

For example, the video generator 134 generates one video (merged video) by merging a part of each of a plurality of videos having different positional information associated with each of a plurality of videos obtained by the video obtainer 133 in a spatial manner. For example, the video generator 134 generates one frame using a part or an entire of frames included in each of a plurality of videos obtained by the video obtainer 133 and generates one video by combining a plurality of frames in a time series manner.

The process of merging the frames included in each of a plurality of videos in a spatial manner is, for example, the following processes (a) (b).

(a) Method Based on Image Processing

For example, the video generator 134 performs the process of matching the direction and the scale of each of a plurality of frames as the object of connecting the videos in a spatial manner. Then, the video generator 134 detects identical regions in each of a plurality of frames, for example. Then, the video generator 134 performs the process of overlapping a plurality of frames having the identical regions to generate one frame of a wide area, for example. Note that it is possible to detect the identical regions in a plurality of frames using the conventionally known technology.

(b) Method Based on Machine Learning

For example, the video generator 134 gives a plurality of frames and learning models to the module for performing the prediction processing of the machine learning, executes the module, and obtains one frame of a wide area.

Note that the learning model is obtained by using a plurality of frames as an explanatory variable, giving a plurality of teacher data using one frame of a wide area generated from the plurality of frames as an objective variable to the module performing the learning process of the machine learning and executing the module.

The learning model may be also referred to as a learning device, a classifier, a classification model or the like. The algorithm of the machine learning is not limited. Although the deep learning is preferable, the random forest or other algorithms can be also used. Various existing functions and libraries of the machine learning such as a library of Ten-sorFlow and a module of random forest of R language can be used for the machine learning, for example.

The right holder processor 135 performs the right holder process. The right holder process is the process about the right holder identified by the right holder identifier associated with the video. For example, the right holder processor 135 performs the right holder process which is the process performed in response to the transmission of the video from the video transmitter 141 and the process about the right holder identified by the right holder identifier associated with the video. For example, the right holder process is the later-described first preservation process, the later-described second preservation process, the later-described third preservation process, the later-described fourth preservation process and the later-described rewarding process.

Note that the right holder identifier associated with one video is, for example, the right holder identifier associated with each of one or a plurality of videos which is the source of one video (combined video or merged video) or an identifier of the user who request the one video. The user who requested one video is the user of the user terminal 3 transmitting the inquiry.

The first preserver 1351 performs the first preservation process of accumulating one video generated by the video generator 134 while being associated with the attribute value set associated with each of one or a plurality of videos which is the source of the one video. The first preserver 1351 may perform the first preservation process of accumulating the video received from the mobile terminal 2 while being associated with the attribute value set associated with the video.

The second preserver 1352 performs the second preservation process of accumulating one video generated by the video generator 134 while being associated with the right holder identifier corresponding to each of one or a plurality of videos which is the source of the one video.

Note that the first preserver 1351 or the second preserver 1352 may accumulate one video generated by the video generator 134 while being associated with the attribute value set associated with each of one or a plurality of videos which is the source of the one video and associated with the right holder identifier corresponding to each of one or a plurality of videos which is the source of the one video.

The third preserver 1353 accumulates the one video generated by the video generator 134 while being associated with the right holder identifier for identifying the user of the user terminal 3. Note that the user of the user terminal 3 here is the person viewing one video. The user terminal 3 here is, for example, the terminal transmitted the inquiry.

The destination in which one video is accumulated is, for example, the storage 11. However, one video may be accumulated in the other devices included in a blockchain.

The fourth preserver 1354 performs the fourth preservation process of accumulating a preservation information. The preservation information includes the access information for accessing the accumulated one video. The process of accumulating the videos and the fourth preservation process of the preservation information corresponding to the video may be performed in any order.

For example, the fourth preserver 1354 performs the fourth preservation process of accumulating the preservation information generated and accumulated in the video generator 134 in a blockchain. Here, the preservation information includes the access information for accessing the accumulated one video.

Note that the fourth preserver 1354 preferably accumulates the preservation information in a blockchain. Namely, the fourth preserver 1354 preferably accumulates the preservation information in a distributed ledger in a blockchain. The fourth preserver 1354 preferably registers the preservation information as an NFT (non-fungible token). The fourth preserver 1354 preferably registers the preservation information in a distributed file system in an IPFS (Inter Planetary File System) network.

The preservation information is the information for retaining the originality of the video. The preservation information is, in other words, the headline information of the video. The preservation information is, for example, the access information and one or more video attribute values. The preservation information preferably includes one or a plurality of right holder identifiers, for example. When the preservation information includes a plurality of right holder identifiers, the video may be shared by right holders or the plurality of right holder identifiers may be right holder history information. The right holder history information is a set of right holder identifiers and information indicating the history of right holder changes. The fourth preservation process guarantees the originality of the preservation information of the registered video. The guarantee of the originality of the preservation information also guarantees the originality of the video corresponding to the preservation information. Note that the access information is the information for accessing the video. The access information is the information for identifying the destination in which the video is accumulated. The access information is, for example, URL and URI.

The preservation information preferably includes the information (also referred to a flag) indicating whether or not the video can be provided to a third party. The flag is, for example, the information indicating that the video is viewable by a third party, that the video may be for sale or that the video is neither viewable nor for sale.

The rewarding unit 1355 performs the rewarding process for each of right holders identified by the right holder identifier associated with each of a plurality of videos which are the source of the one video generated by the video generator 134.

The rewarding process is a process of providing a reward. For example, the rewarding process is the process of increasing points managed in a manner paired with each of one or a plurality of right holder identifiers associated with the video. For example, the rewarding process is the process of paying money to the right holder identified by each of one or a plurality of right holder identifiers associated with the video. For example, the rewarding process is the process of transmitting the video or other contents to the user terminal 3 of the right holder identified by each of one or a plurality of right holder identifiers associated with the video. The rewarding process may be any processes of providing a merit to the right holder identified by each of one or a plurality of right holder identifiers associated with the video. The content of the rewarding process is not limited. The reward may be provided in any form, including money, points, products, and contents. The content of the reward is not limited.

The rewarding unit 1355 preferably obtains one or a plurality of video attribute values associated with each of a plurality of videos which are the source of one video transmitted by the video transmitter 141, determines the reward to each of the plurality of right holders using one or more video attribute values and performs the rewarding process which is the process of providing the reward.

Here, one or more video attribute values are, for example, the data amount of the video, the time of the video, the number of frames of the video and the resolution of the video.

The rewarding unit 1355 preferably obtains a reward amount corresponding to a service identifier for identifying the service performed on the target video and performs the rewarding process which is the process of providing the reward corresponding to the reward amount. Note that the service identifier is, for example, "viewing" and "purchasing." In the above described case, the storage 11 stores the reward amount corresponding to the service identifier or the information for determining the reward amount corresponding to the service identifier.

For example, the rewarding unit 1355 obtains the reward amount and performs the rewarding process which is the process of providing the reward corresponding to the reward amount using one or a plurality of information of one or a plurality of video attribute values and service identifiers. In the above described case, an arithmetic expression or a table corresponding to each of a plurality of service identifiers is stored in the storage 11, for example. The arithmetic expression is the expression for calculating the reward amount using one or a plurality of video attribute values as parameters. The table includes a plurality of correspondence information for managing the reward amount corresponding to one or a plurality of video attribute values.

The rewarding unit 1355 normally performs the process of causing the user that has enjoyed the service relevant to the target video to pay the reward. The process of causing the user to pay the reward is, for example, the process of causing the user to pay the obtained reward amount. The process of causing the user to pay the reward is, for example, the process of causing the user to pay the obtained reward amount and the profit obtained by the management side of the information processing device 1. The process of causing the user to pay the reward is, for example, the process of reducing the points corresponding to the user receiving the service or the settlement process using the credit card number of the corresponding user.

The transmitter 14 transmits various information and instructions to the mobile terminal 2 or the user terminal 3. The various information and instructions are, for example, the video, the transmission instruction and a finish instruction. Note that the finish instruction is the instruction for finishing the transmission of the video.

The video transmitter 141 transmits the video generated by the video generator 134 to the user terminal 3. The video generated by the video generator 134 may be the video itself obtained by the video obtainer 133.

<Detail of Components of Mobile Terminal 2>

The mobile storage 21 stores various kinds of information. The various kinds of information are, for example, the video, the video attribute value set, the right holder identifier or the camera attribute value. The camera attribute value is the attribute value of the camera. The camera attribute value is, for example, an angle of view, a direction information and a resolution.

For example, one or more attribute values included in the attribute value set is associated with one or more still images (also referred to as fields or frames) included in the video. The one or more mobile video attribute values may be associated with all still images, associated with a part of the still images or associated with a plurality of still images.

The mobile receiver 22 receives various kinds of information. The various kinds of information are, for example, the transmission instruction or the finish instruction. The mobile instruction receiver 221 receives the transmission instruction from the information processing device 1.

The mobile processor 23 performs various kinds of processes. For example, the various kinds of processes are performed by the position obtainer 231, the image capturer 232, the attribute value obtainer 233 and the generator 234.

The position obtainer 231 obtains the relative position information for identifying the relative position of the mobile terminal 2 in the indoor environment. The position obtainer 231 obtains the absolute position information indicating the position of the mobile terminal 2 in an outdoor environment.

The absolute position obtainer 2311 obtains the absolute position information of the mobile terminal 2. For example, the absolute position obtainer 2311 obtains the absolute position information by a GPS receiver. The absolute position obtainer 2311 preferably accumulates the latest obtained absolute position information in the mobile storage 21.

The relative position obtainer 2312 obtains the relative position information of the mobile terminal 2. The relative position obtainer 2312 preferably accumulates the latest obtained relative position information in the mobile storage 21.

The relative position obtainer 2312 preferably obtains the relative position information when the absolute position obtainer 231 is unable to obtain the absolute position information. For example, the relative position obtainer 2312 obtains the relative position information when the mobile terminal 2 moves from outdoors to indoors.

For example, the relative position obtainer 2312 obtains the relative position information of the mobile terminal 2 using LiDAR. For example, the relative position obtainer 2312 receives the signals from three or more signal transmitters and calculates the relative position information using the strength of each of the three or more signals and the positional information of each of the three or more signal transmitters. For example, the relative position obtainer 2312 receives the relative position information from the signal transmitter (e.g., RFID tag, Beacon) transmitting the relative position information. However, the means and the method of obtaining the relative position information by the relative position obtainer 2312 are not limited. For example, the relative position obtainer 2312 receives the area identifier from the signal transmitter installed indoors. For example, the relative position obtainer 2312 receives the area identifier and the floor identifier from the signal transmitter installed indoors. For example, the relative position obtainer 2312 receives the location name from the signal transmitter installed indoors. Note that the technology for obtaining the relative position information in the indoor environment by the relative position obtainer 2312 is not limited.

The image capturer 232 captures the video. For example, the image capturer 232 captures the video during the movement of the providing terminal 2. The positional information obtained by the position obtainer 231 is preferably associated with the captured video.

The image capturer 231 preferably accumulates the captured video in the mobile storage 21. The image capturer 231 preferably overwrites the area storing old video with new video when the storage capacity of the mobile storage 21 for accumulating the video is limited. Namely, the mobile storage 21 preferably has a ring buffer structure.

The attribute value obtainer 233 obtains one or more camera attribute values including the direction information indicating the direction captured by the image capturer 232. The attribute value obtainer 233 preferably obtains one or a plurality of video attribute values including the camera attribute value.

The attribute value obtainer 233 obtains, for example, one or more video attribute values. The one or a plurality of video attribute values can be referred to as the attribute value set. The attribute value obtainer 233 obtains, for example, the time information from a not-illustrated clock during image capturing. The attribute value obtainer 233 obtains, for example, the time information continuously, at predetermined intervals, or when the obtaining condition is satisfied. The attribute value obtainer 233 obtains, for example, the time information from a not-illustrated clock during video capturing, and obtains the season information corresponding to the time information. The attribute value obtainer 233 obtains, for example, the weather information during video capturing. Even when the video is captured indoors, the weather information may be the weather information of the area similar to the indoor environment. The mobile processor 23 obtains, for example, the weather information corresponding to the positional information from a not-illustrated weather server. The mobile processor 23 obtains, for example, the weather information continuously, at predetermined intervals, or when the obtaining condition is satisfied. The attribute value obtainer 233 obtains, for example, the temperature information during image capturing. The mobile processor 23 obtains, for example, the temperature information corresponding to the positional information from a not-illustrated server. The mobile processor 23 obtains, for example, the temperature information from a temperature sensor installed in the movable body. The mobile processor 23 obtains, for example, the temperature information continuously, at predetermined intervals, or when the obtaining condition is satisfied. Note that the obtaining condition is, for example, when the analysis result of the video satisfies a predetermined condition.

The generator 234 associates the obtained positional information with the video to obtain the additional video. For example, the generator 234 associates the relative position information or the absolute position information obtained by using the relative position information with the video to obtain the additional video. For example, the generator 234 associates the absolute position information obtained by the absolute position obtainer 2311 with the video to obtain the additional video.

For example, the generator 234 obtains the additional video in which one or more camera attribute values obtained by the attribute value obtainer 233 are also associated with the video. For example, the generator 234 obtains the additional video in which one or more video attribute values obtained by the attribute value obtainer 233 are also associated with the video.

The mobile transmitter 24 transmits various kinds of information to the information processing device 1. The various kinds of information are, for example, the positional information, the video and the additional video. The mobile transmitter 24 may transmit the video obtained by the image capturer 232 continuously to the information processing device 1. In the above described case, the positional information is normally associated with the video.

It is preferred that the mobile transmitter 24 stops transmitting the video when the finish instruction is received.

The position transmitter 241 transmits the positional information obtained by the position obtainer 231 to the information processing device 1. The positional information is, for example, the relative position information or the absolute position information obtained by using the relative position information.

It is preferred that the position transmitter 241 continuously transmits the positional information to the information processing device 1. The concept of "continuously" includes the concepts of "always" and "periodically." The concept of "periodically" means that the transmission interval may be slightly varied. The frequency and the interval of transmitting the positional information by the position transmitter 241 are not limited.

The mobile video transmitter 242 transmits the video when the mobile instruction receiver 221 receives the transmission instruction. The mobile video transmitter 242 preferably transmits the additional video.

The mobile output unit 25 outputs various kinds of information. The various kinds of information are, for example, the video and the attribute value set.

The output is the concept including the operation of displaying on a display, the operation of projecting with a projector, the operation of printing with a printer, the operation of outputting sound, the operation of transmitting to an external device, the operation of accumulating in a recording medium, and the operation of delivering a processed result to another processor or another program.

The video output unit 251 outputs the video. The video output unit 251 preferably outputs the additional video. The output here may be the accumulation in the mobile storage 21.

<Detail of Components of User Terminal 3>

The user storage 31 stores various kinds of information. The various kinds of information are, for example, the user identifier, the video and the inquiry.

The user acceptor 32 accepts various kinds of instructions and information. The various kinds of instructions and information are, for example, the inquiry and the purchase instruction. Note that the inquiry may include the purchase instruction.

Note that the purchase instruction is the instruction for purchasing the video. The purchase instruction is associated with the user identifier. The purchase instruction normally includes the information identifying the video. The purchase instruction includes, for example, a video identifier. The purchase instruction includes, for example, an inquiry. The purchase instruction includes, for example, a purchase condition. The purchase condition is, for example, a purchase price. The purchase condition includes, for example, the information identifying a right period.

The various kinds of instructions and information may be input in any manner, such as with a touch panel, a keyboard, a mouse and a menu screen.

The user processor 33 performs various kinds of processes. The various kinds of processes are, for example, the processes related to the data structure for transmitting various kinds of instructions and information received by the user acceptor 32. The various kinds of processes are, for example, the processes related to the structure of transmitting the information received by the user receiver 35.

The user transmitter 34 transmits various kinds of instructions and information to the information processing device 1. The various kinds of instructions and information are, for example, the inquiry and the purchase instruction.

The user receiver 35 receives various kinds of information and instructions. The various kinds of information and instructions are, for example, the video and the additional video. Note that it can be considered that the video is the concept including the additional video.

The user output unit 36 outputs various kinds of information. The various kinds of information are, for example, the video and the additional video.

The output here is the concept including the operation of displaying on a display, the operation of projecting with a projector, the operation of printing with a printer, the operation of outputting sound, the operation of transmitting to an external device, the operation of accumulating in a recording medium, and the operation of delivering a processed result to another processor or another program.

The storage 11, the terminal manager 111, the mobile storage 21 and the user storage 31 are preferably a nonvolatile recording medium. However, these storages may be a volatile recording medium.

The process of storing the information in the storage 11 or the like is not limited. For example, the information may be stored in the storage 11 or the like via a recording medium, the information transmitted via a communication line or the like may be stored in the storage 11 or the like, or the information inputted by an input device may be stored in the storage 11 or the like.

The receiver 12, the position receiver 121, the inquiry receiver 122, the mobile receiver 22, the mobile instruction receiver 221 and the user receiver 35 are normally implemented by a wireless or wired communication means. However, these receivers may be implemented by a means for receiving a broadcast.

The processor 13, the position accumulator 131, the terminal determination unit 132, the video obtainer 133, the video generator 134, the right holder processor 135, the first preserver 1351, the second preserver 1352, the third preserver 1353, the fourth preserver 1354, the rewarding unit 1355, the mobile processor 23, the position obtainer 231, the attribute value obtainer 233, the generator 234 and the user processor 33 may normally be implemented by a processor, a memory or the like. The processing procedure of the processor 13 or the like is normally implemented by a software and the software is stored in a recording medium such as a read-only memory (ROM). However, the processing procedure may be implemented by a hardware (dedicated circuit). Note that the processor is a central processing unit (CPU), a microprocessor unit (MPU), a graphical processing unit (GPU) or the like. The type of the processor is not limited.

The transmitter 14, the video transmitter 141, the mobile transmitter 24, the position transmitter 241, the mobile video transmitter 242 and the user transmitter 34 are normally implemented by a wireless or wired communication means. However, these transmitters may be implemented by a broadcast means.

The absolute position obtainer 2311 is achieved, for example, by a GPS receiver.

The relative position obtainer 2312 is achieved, for example, by a LIDAR. The relative position obtainer 2312 is achieved, for example, by the communication means, software or the like.

The image capturer 232 includes a camera capable of capturing the video. Note that the type of the camera is not limited.

The mobile output unit 25 and the video output unit 251 may be implemented, for example, by an output device such as a display and a speaker or a driver software of the output device and the output device, for example. The mobile output unit 25 and the video output unit 251 may normally be implemented, for example, by a processor, a memory or the like.

The user acceptor 32 may be implemented by a device driver of an input device such as a touch panel and a keyboard or a control software of a menu screen, for example.

The user output unit 36 may or may not include an output device such as a display or a speaker. The user output unit 36 may be implemented by a driver software of an output device or implemented by a driver software of the output device and the output device, for example.

<Operation>

Then, the operation example of the information system A will be explained. First, the operation example of the information processing device 1 will be explained using the flowchart in FIG. 4. Note that "S" shown in each flowchart used in the following explanation means the step.

(S401) The position receiver 121 determines whether or not the positional information is received from the mobile terminal 2. When the positional information is received, the processing proceeds to S402. When the positional information is not received, the processing proceeds to S403. Note that the received positional information is associated with the terminal identifier.

(S402) The position accumulator 131 accumulates the positional information received in S401 in the terminal manager 111 while being associated with the terminal identifier. The processing returns to S401.

When the position accumulator 131 receives the relative position information, the position accumulator 131 may obtain the absolute position information from the absolute position information of the reference point and the relative position information and accumulate the absolute position information in the terminal manager 111 while being associated with the terminal identifier.

(S403) The inquiry receiver 122 determines whether or not the inquiry is received from the user terminal 3. When the inquiry is received, the processing proceeds to S404. When the inquiry is not received, the processing proceeds to S401. Note that the inquiry is normally associated with the user identifier of the user transmitting the inquiry.

(S404) The terminal determination unit 132 determines one or more mobile terminals 2 satisfying the approximate condition with respect to the location identification information included in the inquiry. An example of the above described terminal determination process will be explained using the flowchart in FIG. 5. Note that the mobile terminal 2 satisfying the approximate condition is the mobile terminal 2 corresponding to the positional information satisfying the approximate condition.

(S405) The video obtainer 133 substitutes 1 for a counter i.

(S406) The video obtainer 133 determines whether or not the i-th mobile terminal 2 exists in the mobile terminals 2 determined in S404. When the i-th mobile terminal 2 exists, the processing proceeds to S407. When the i-th mobile terminal 2 does not exist, the processing proceeds to S409.

(S407) The video obtainer 133 obtains the terminal communication information of the i-th mobile terminal 2 from the terminal manager 111. The video obtainer 133 transmits the transmission instruction of the video to the i-th mobile terminal 2 using the terminal communication information.

(S408) The video obtainer 133 increments the counter i by 1. The processing returns to S406.

(S409) The receiver 12 determines whether or not the video is received from one or a plurality of mobile terminals 2. When the video is received, the processing proceeds to S410. When the video is not received, the processing returns to S409. Here, it is preferable to wait until the videos are received from all of the mobile terminals 2 from which the transmission instruction is transmitted.

(S410) The video generator 134 determines whether or not a plurality of videos is received in S409. When a plurality of videos is received, the processing proceeds to S411. When a plurality of videos is not received, the processing proceeds to S412.

(S411) The video generator 134 performs a process of merging a plurality of videos in a spatial manner. An example of the above described video merging process will be explained using the flowchart in FIG. 6.

(S412) The video generator 134 arranges the obtained video in a buffer for transmitting the video. The video transmitter 141 transmits the video in the buffer to the user terminal 3 from which the inquiry is transmitted.

(S413) The terminal determination unit 132 obtains the latest positional information of each of one or more mobile terminals 2 determined in S404 from the terminal manager 111.

It is assumed that the position receiver 121 normally receives the positional information continuously and always receives the positional information from each of one or more mobile terminals 2 and the position accumulator 131 accumulates the latest positional information in the terminal manager 111 while being associated with the terminal identifier.

(S414) The terminal determination unit 132 determines whether or not the approximate condition is satisfied between the location identification information included in the inquiry and the latest positional information of each of one or more mobile terminals 2. When the approximate condition is satisfied, the processing proceeds to S409. When the approximate condition is not satisfied, the processing proceeds to S415.

Namely, as long as the latest positional information of each of the mobile terminals 2 determined in S404 satisfies the approximate condition, the video is received from each of the mobile terminals 2. When the positional information no longer satisfies the approximate condition, the video reception from the mobile terminal 2 is finished.

(S415) The transmitter 14 transmits the finish instruction to the mobile terminal 2 when the latest positional information of the mobile terminal no longer satisfies the approximate condition.

(S416) The right holder processor 135 performs a preservation process. An example of the preservation process will be explained using the flowchart in FIG. 8.

(S417) The processor 13 determines whether or not the process of transmitting the video to the user terminal 3 will be finished. When the process of transmitting the video will be finished, the processing returns to S401. When the process of transmitting the video will not be finished, the processing returns to S404.

Figure 4:
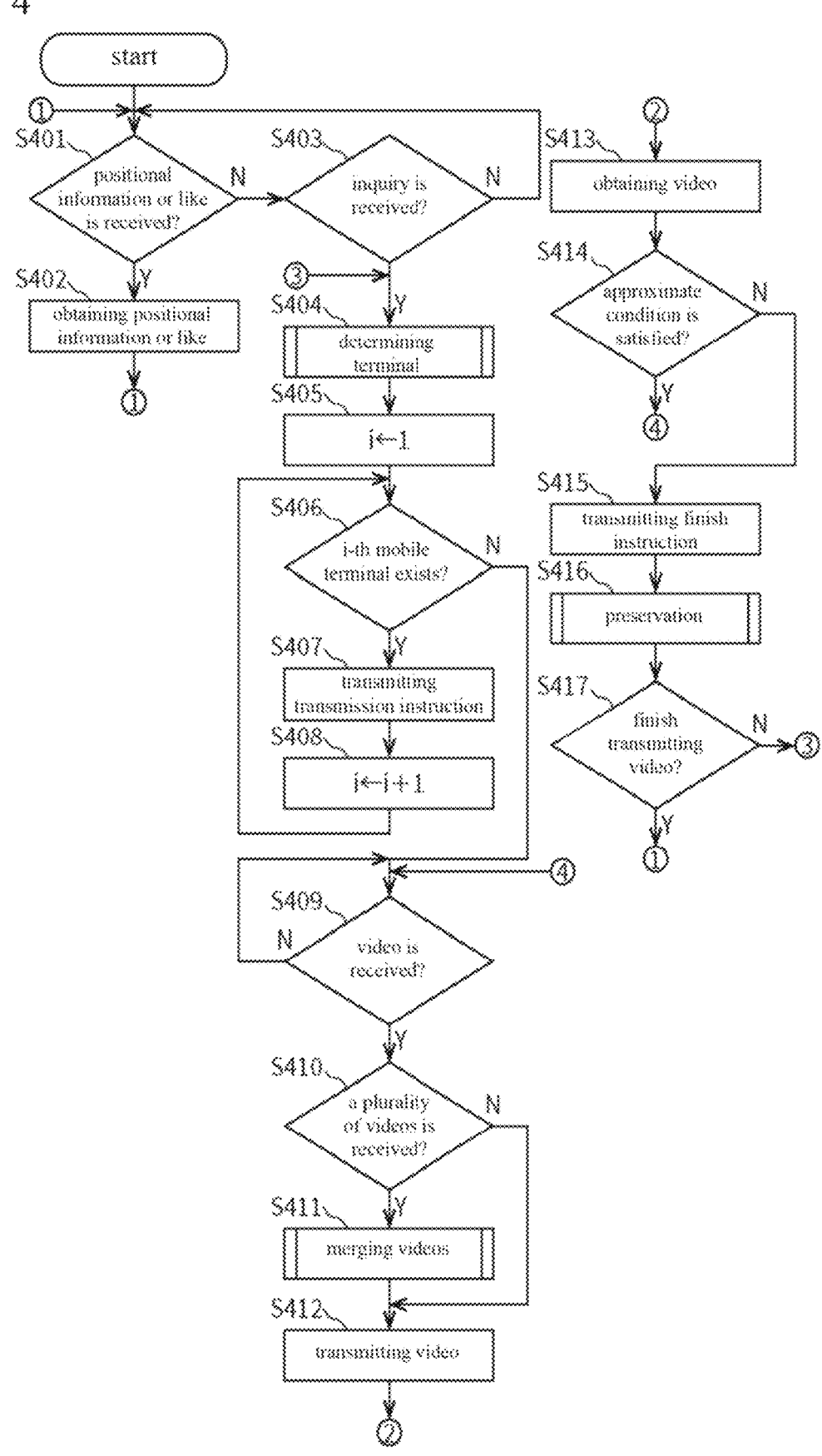
FIG. 4 is a flowchart for explaining an operation example of the information processing device 1 in the first embodiment.

In the flowchart in FIG. 4, the process ends when the power is turned off or the instruction of ending process is interrupted.

Then, an example of the terminal determination process in S404 will be explained using the flowchart in FIG. 5.

(S501) The terminal determination unit 132 obtains the location identification information from the received inquiry.

(S502) The terminal determination unit 132 substitutes 1 for a counter i.

(S503) The terminal determination unit 132 determines whether or not the i-th terminal information exists in the terminal manager 111. When the i-th terminal information exists, the processing proceeds to S504. When the i-th terminal information does not exist, the processing proceeds to S509.

(S504) The terminal determination unit 132 obtains the latest positional information included in the i-th terminal information from the terminal manager 111.

(S505) The terminal determination unit 132 determines whether or not the approximate condition is satisfied between the location identification information obtained in S501 and the positional information obtained in S504. When the approximate condition is satisfied, the processing proceeds to S506. When the approximate condition is not satisfied, the processing proceeds to S508.

(S506) The terminal determination unit 132 obtains the terminal communication information included in the i-th terminal information from the terminal manager 111 and accumulates the terminal communication information in a not-illustrated buffer.

(S507) The terminal determination unit 132 calculates the distance between the position indicated by the location identification information obtained in S501 and the position indicated by the positional information obtained in S504.

(S508) The terminal determination unit 132 increments the counter i by 1. The processing returns to S503.

(S509) The terminal determination unit 132 sorts the mobile terminals 2 using the distance as a key. The processing returns to the upstream process. Note that the operation of sorting the mobile terminals 2 is the operation of sorting the terminal communication information.

Figure 5:
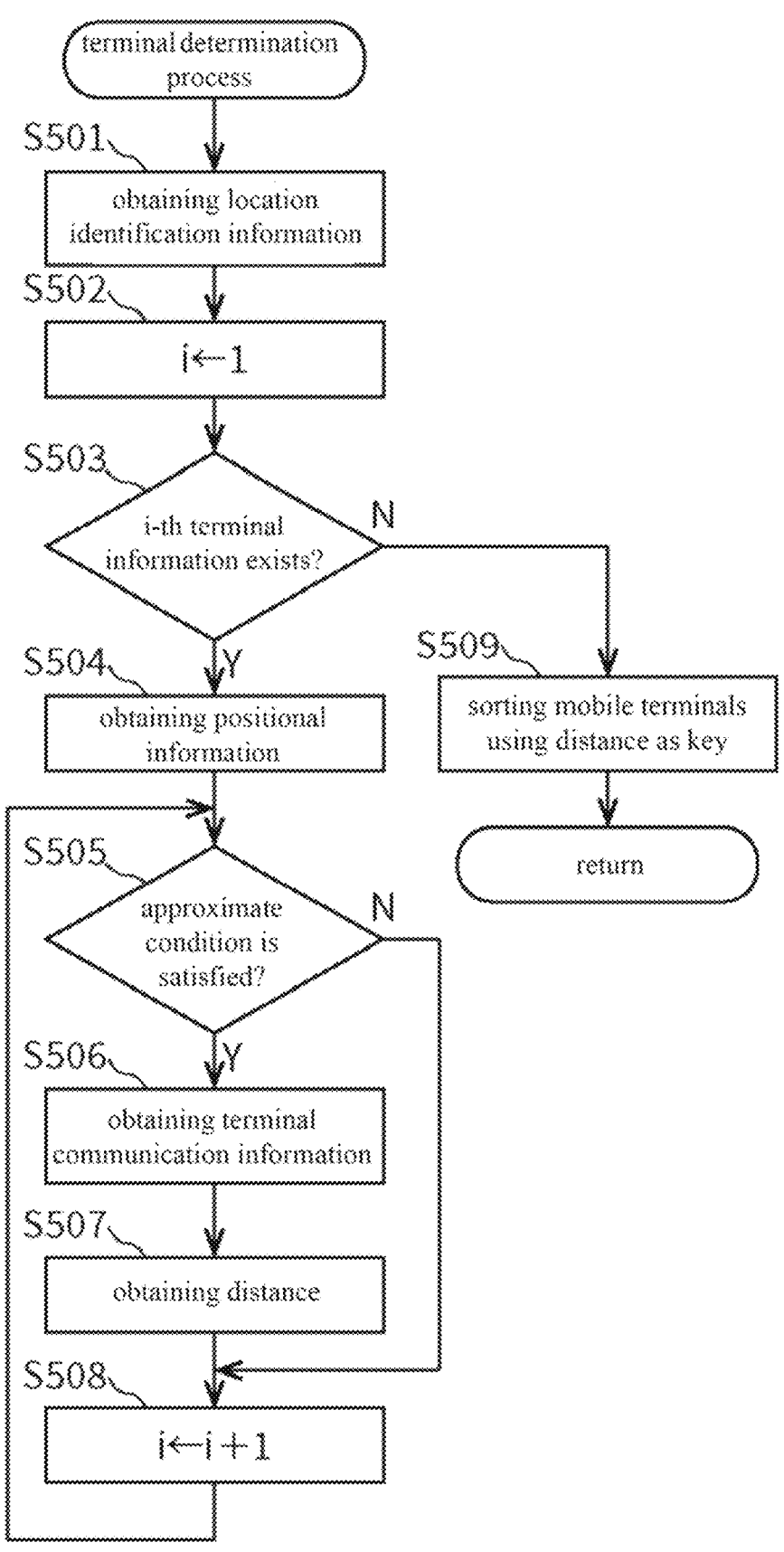
FIG. 5 is a flowchart for explaining an example of a terminal determination process in the first embodiment.

In the flowchart in FIG. 5, the terminal determination unit 132 may determine only a preliminarily determined number of mobile terminals 2 or fewer. The preliminarily determined number is, for example, "1" or "2." For example, the terminal determination unit 132 may determine only a preliminarily determined number of mobile terminals 2 or fewer in ascending order of the distance obtained in S507.

Figure 6:
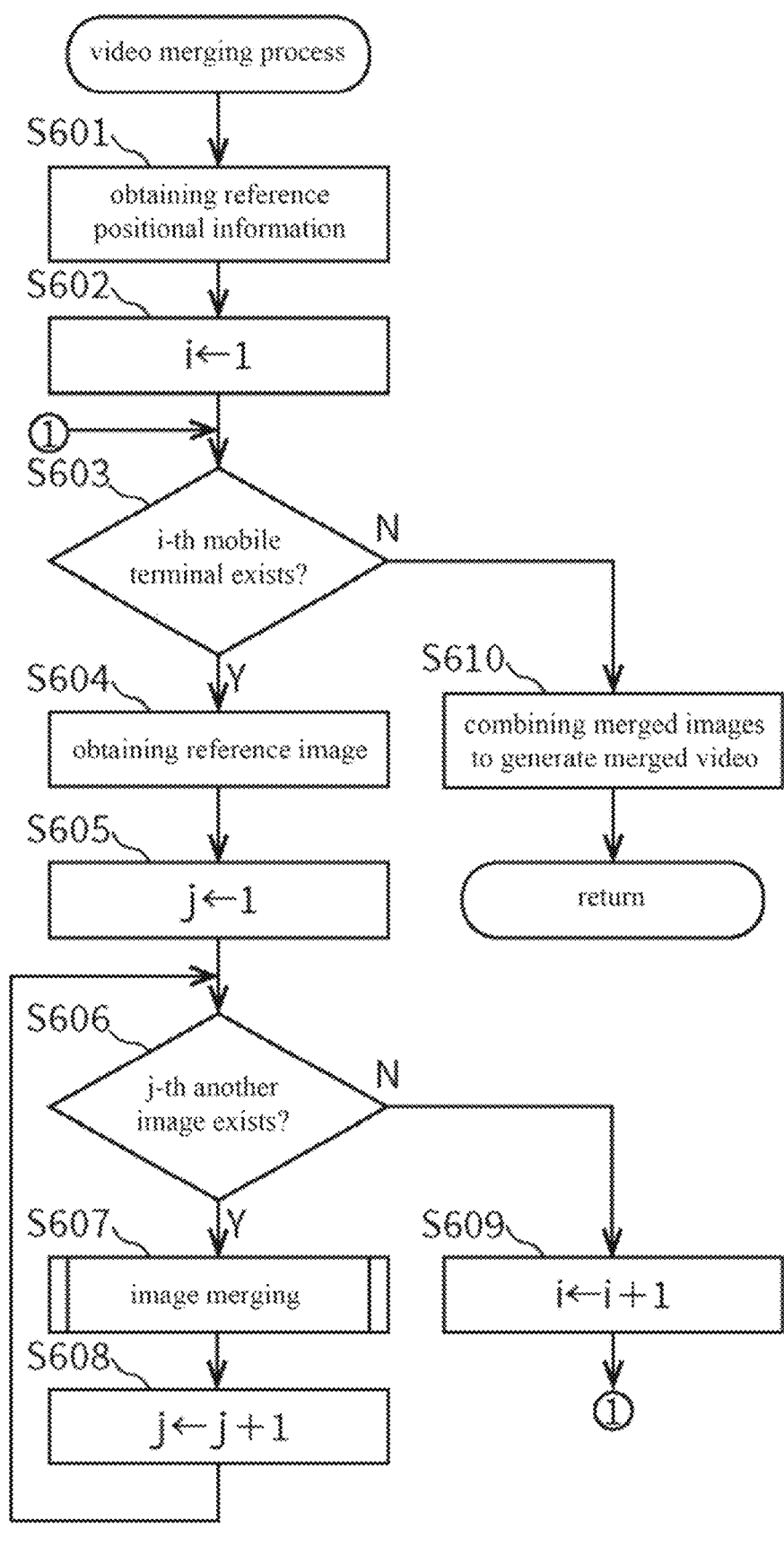
FIG. 6 is a flowchart for explaining an example of a video merging process in the first embodiment.

Then, an example of the video merging process in S411 will be explained using the flowchart in FIG. 6.

(S601) The video generator 134 obtains a reference positional information. The reference positional information is, for example, the positional information indicated by the location identification information included in the received inquiry. The reference positional information is, for example, the positional information of the mobile terminal 2 having the shortest distance from the position indicated by the location identification information.

(S602) The video generator 134 substitutes 1 for a counter i.

(S603) The video generator 134 determines whether or not the i-th time (i-th frame) exists in the video. When the i-th time exists, the processing proceeds to S604. When the i-th time does not exist, the processing proceeds to S610.

(S604) The video generator 134 obtains a reference image. The reference image is the image in the video transmitted by the mobile terminal 2 having the shortest distance from the position indicated by the location identification information. Note that the initial reference image is the first frame in the video transmitted by the mobile terminal 2.

(S605) The video generator 134 substitutes 1 for a counter j.

(S606) The video generator 134 determines whether or not the j-th another image exists. When the j-th another image exists, the processing proceeds to S607. When the j-th another image does not exist, the processing proceeds to S609. Note that another image is the frame in the video transmitted by another mobile terminal 2. Note that the reference image and another image are normally are synchronized with each other.

(S607) The video generator 134 performs the image merging process. An example of the image merging process will be explained using the flowchart in FIG. 7.

(S608) The video generator 134 increments the counter j by 1. The processing returns to S604.

(S609) The video generator 134 increments the counter i by 1. The processing returns to S603.

(S610) The video generator 134 combines a plurality of merged images merged in S607 in a time series manner to generate a merged video and accumulates the merged video in a not-illustrated buffer. The processing returns to the upstream process.

Figure 7:
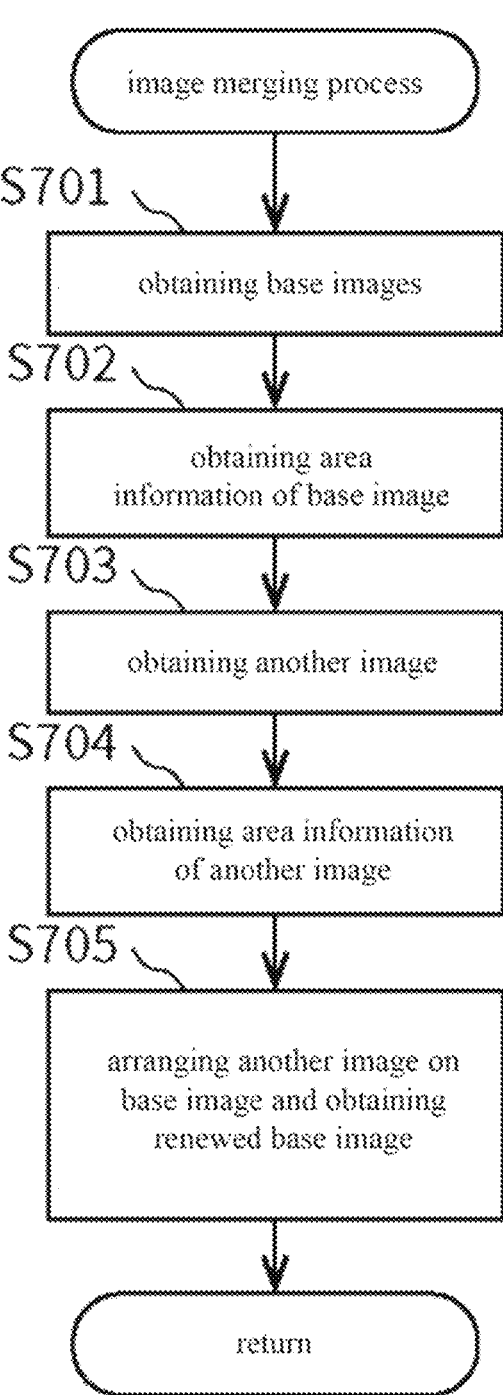
FIG. 7 is a flowchart for explaining an example of an image merging process in the first embodiment.

Then, an example of the image merging process in S607 will be explained using the flowchart in FIG. 7.

(S701) The video generator 134 obtains the base image. Note that the initial base image is the reference image obtained in S602. In addition, the base image is the base image renewed in S607 in the previous loop of S606 to S608.

(S702) The video generator 134 obtains an area information for identifying the area covered by the base image obtained in S701. Note that the area information is, for example, a set of the positional information representing the vertices of a polygon or a set of two positional information representing the diagonal of a rectangle.

(S703) The video generator 134 obtains the j-th another image in S606.

(S704) The video generator 134 obtains the area information for identifying the area covered by another image obtained in S703.

(S705) The video generator 134 determines the area for arranging another image with respect to the base image and arranges another image on the determined area to obtain the renewed base image using the area information of the base image and the area information of another image. The processing returns to the upstream process.

Then, an example of the preservation process in S416 will be explained using the flowchart in FIG. 8.

(S801) The right holder processor 135 accumulates the transmitted video while being associated with the attribute value set associated with each of one or a plurality of videos which are the original video of the transmitted video.

Note that the right holder processor 135 preferably accumulates the video while being paired with the right holder identifier for identifying each of one or a plurality of right holders. The right holder identifier here is, for example, one or more right holder identifiers of the video which is the source of the accumulated video. The right holder identifier here is, for example, one right holder identifier for identifying the user transmitting the inquiry.

For example, the right holder processor 135 accumulates the video in the storage 11 or another devise than the information processing device 1. Another device than the information processing device 1 may be a device included in a blockchain.

(S802) The fourth preserver 1354 performs the fourth preservation process. An example of the above described fourth preservation process will be explained using the flowchart in FIG. 9.

(S803) The right holder processor 135 substitutes 1 for a counter i.

(S804) The right holder processor 135 determines whether or not the i-th video, which is the source of the accumulated video, exists. When the i-th video exists, the processing proceeds to S805. When the i-th video does not exist, the processing returns to the upstream process.

(S805) The rewarding unit 1355 performs the rewarding process. An example of the rewarding process will be explained using the flowchart in FIG. 10. The rewarding process here is the rewarding process to the right holder of the i-th video which is the source of the accumulated video.

(S806) The right holder processor 135 determines whether or not to change the right holder of the i-th video which is the source of the accumulated video. When the right holder will be changed, the processing proceeds to S807. When the right holder will not be changed, the processing proceeds to S808.

Whether or not to change the right holder may be determined based on the flag associated with the i-th video, may be preliminarily determined, or may be changed when "the information indicating the change request of the right holder" is included in the inquiry.

(S807) The right holder processor 135 obtains the user identifier of the user terminal 3. Note that the above described user identifier becomes a new right holder identifier.

(S808) The first preserver 1351 accumulates the i-th video which is the source of the accumulated video.

(S809) The fourth preserver 1354 performs the fourth preservation process related to the i-th video which is the source of the accumulated video. An example of the fourth preservation process will be explained using the flowchart in FIG. 9.

(S810) The right holder processor 135 increments the counter i by 1. The processing returns to S804.

Figure 8:
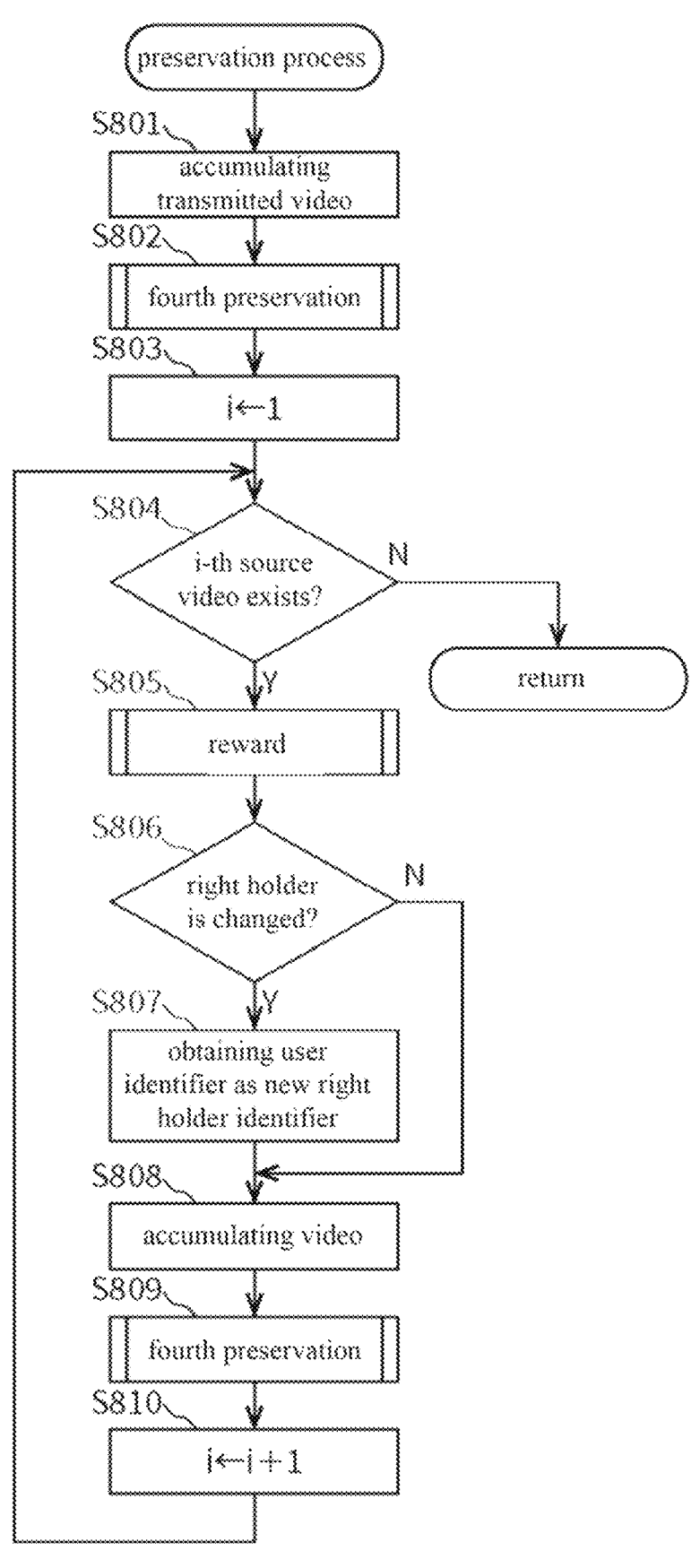
FIG. 8 is a flowchart for explaining an example of a preservation process in the first embodiment.

In the flowchart in FIG. 8, the process (S808) of accumulating a plurality of videos which are the source of the combined video and the fourth preservation process (S809) are performed when the combined video is generated. However, the above described processes may be omitted.

Figure 9:
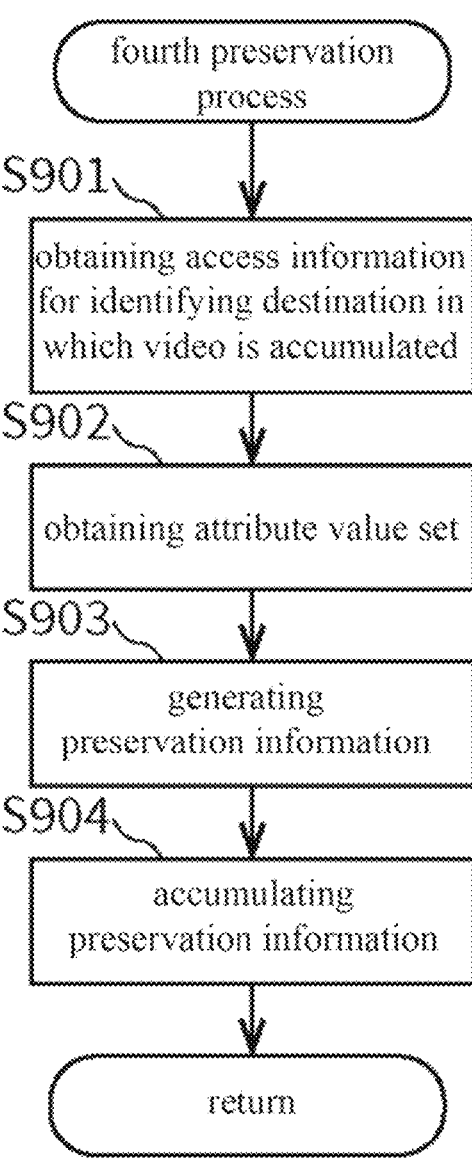
FIG. 9 is a flowchart for explaining an example of a fourth preservation process in the first embodiment.

Then, an example of the fourth preservation process in S802 and S809 will be explained using the flowchart in FIG. 9.

(S901) The fourth preserver 1354 obtains the access information for identifying the destination in which the video is accumulated. Note the above described video is, for example, the merged video or the combined video.

(S902) The fourth preserver 1354 obtains the attribute value set corresponding to the accumulated video. When the accumulated video is generated by a plurality of original videos, the attribute value set corresponding to the video is the attribute value set of each of the plurality of original videos.

(S903) The fourth preserver 1354 generates the preservation information including the access information obtained in S901, the attribute value set obtained in S902 and the right holder identifier of the video. When new right holder identifier is obtained, the fourth preserver 1354 generates, for example, the preservation information including the new right holder identifier and the original right holder identifier.

(S904) The fourth preserver 1354 accumulates the preservation information generated in S903. The processing returns to the upstream process.

In S904, when the preservation information of the video corresponding to the preservation information to be accumulated is accumulated, the preservation information is overwritten on the preservation information generated in S903. Consequently, the change history of the right holder of the video can be managed, for example. The fourth preserver 1354 accumulates the preservation information in a blockchain, for example.

Then, an example of the rewarding process in S805 will be explained using the flowchart in FIG. 10.

(S1001) The rewarding unit 1355 obtains one or a plurality of right holder identifiers of the target video. The rewarding unit 1355 may obtain the right holder identifier of the past right holder of the target video.

(S1002) The rewarding unit 1355 obtains the attribute value set of the target video.

(S1003) The rewarding unit 1355 obtains the service identifier for identifying the service performed on the target video. The service identifier is, for example, "viewing" and "purchasing."

(S1004) The rewarding unit 1355 obtains the reward amount using one or a plurality of information of the attribute value set obtained in S1002 and the service identifier obtained in S1003.

When a plurality of right holder identifiers is obtained, the rewarding unit 1355 obtains the reward amount to each of the right holder identifiers. When the history information of the right holder including a plurality of right holder identifiers is obtained, the rewarding unit 1355 may obtain the reward amount to each of the right holder identifiers.

For example, the rewarding unit 1355 preferably obtains the video attribute value corresponding to each of a plurality of videos which are the source of the video and transmitted by the video transmitter 141 and determines the reward amount of each of a plurality of right holders using the video attribute value. For example, the rewarding unit 1355 preferably determines the reward amount so that the reward amount increases as the data amount, the time of the video or the number of the frames of the original video adopted in the video transmitted by the video transmitter 141 increases. For example, the rewarding unit 1355 preferably determines the reward amount so that the reward amount increases as the resolution of the original video adopted in the video transmitted by the video transmitter 141 increases.

(S1005) The rewarding unit 1355 performs the process of providing the reward to the right holder identified by the right holder identifier obtained in S1001 by the reward amount obtained in S1004.

(S1006) The rewarding unit 1355 performs the process of causing the user that has enjoyed the service relevant to the target video to pay the reward. The processing returns to the upstream process. Note that the target video is normally the video transmitted to the user terminal 3.

Figure 10:
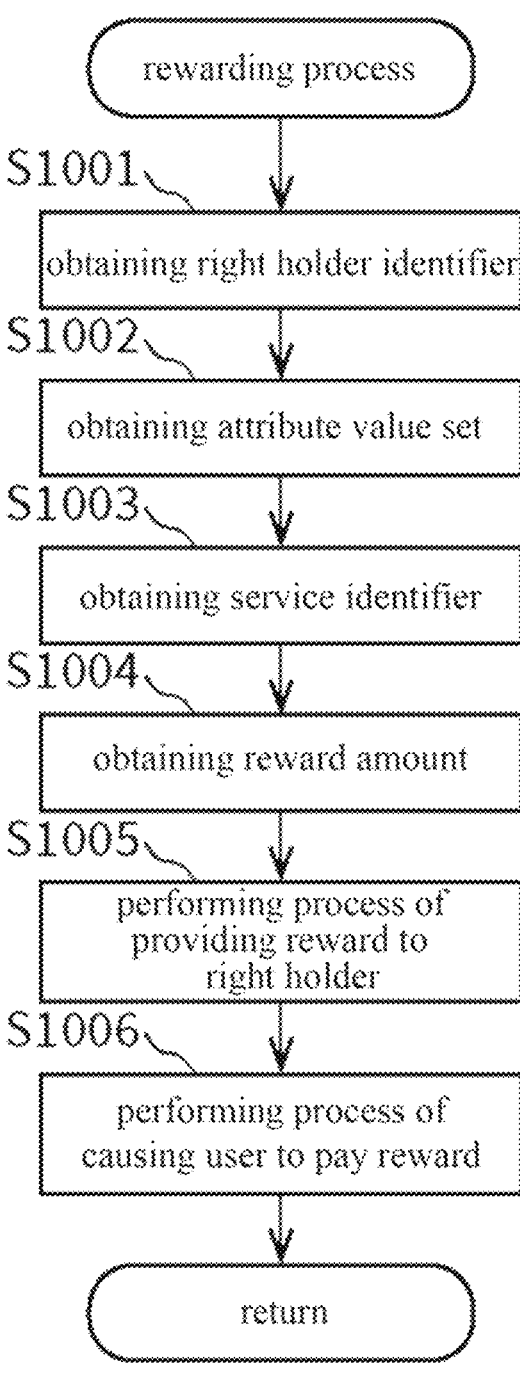
FIG. 10 is a flowchart for explaining an example of a rewarding process in the first embodiment.

In the flowchart in FIG. 10, it is possible to obtain the profit obtained by the management side of the information processing device 1 and accumulate the profit.

Then, an operation example of the mobile terminal 2 will be explained using the flowchart in FIG. 11.

(S1101) The mobile terminal 2 determines whether or not a start instruction is received. When the start instruction is received, the processing proceeds to S1102. When the start instruction is not received, the processing proceeds to S1111. Note that the start instruction is, for example, the start instruction of the video transmission application or the turning on of the mobile terminal 2.

(S1102) The position obtainer 231 performs the position obtaining process. An example of the position obtaining process will be explained using the flowchart in FIG. 12. Note that the position obtaining process is the process of obtaining the current positional information of the mobile terminal 2.

(S1103) The attribute value obtainer 233 obtains one or more video attribute values excluding the positional information.

(S1104) The generator 234 obtains the terminal identifier from the mobile storage 21.

(S1105) The generator 234 generates the information to be transmitted, the information including the positional information, one or more video attribute values and the terminal identifier. The position transmitter 241 transmits the information generated in S1105 to the information processing device 1.

(S1106) The image capturer 232 captures the image and obtains the video.

(S1107) The generator 234 generates the additional video including the video, the positional information, one or more video attribute values and the terminal identifier. The generator 234 accumulates the additional video in the mobile storage 21.

(S1108) The mobile video transmitter 242 determines whether or not to transmit the video to the information processing device 1. When the video will be transmitted, the processing proceeds to S1109. When the video will not be transmitted, the processing proceeds to S1110. Note that the case of transmitting the video is when a transmission flag is "ON." In addition, the initial value of the transmission flag is "OFF."

(S1109) The mobile video transmitter 242 transmits the additional image accumulated in S1107 to the information processing device 1. Note that the amount of the video transmitted at once is not limited.

(S1110) The mobile processor 23 determines whether or not to finish transmitting the positional information and the like. When the transmission will be finished, the processing returns to S1101. When the transmission will not be finished, the processing returns to S1102. Note that the case when the transmission of the positional information and the like is finished is, for example, when the finish instruction is received from the user.

(S1111) The mobile instruction receiver 221 determines whether or not the transmission instruction of the video is received from the information processing device 1. When the transmission instruction is received, the processing proceeds to S1102. When the transmission instruction is not received, the processing returns to S1101.

(S1112) The mobile processor 23 sets the transmission flag to "ON." The processing returns to S1102.

(S1113) The mobile receiver 22 determines whether or not the finish instruction is received from the information processing device 1. When the finish instruction is received, the processing proceeds to S1114. When the finish instruction is not received, the processing returns to S1101.

(S1114) The mobile processor 23 sets the transmission flag to "OFF." The processing returns to S1102.

Figure 11:
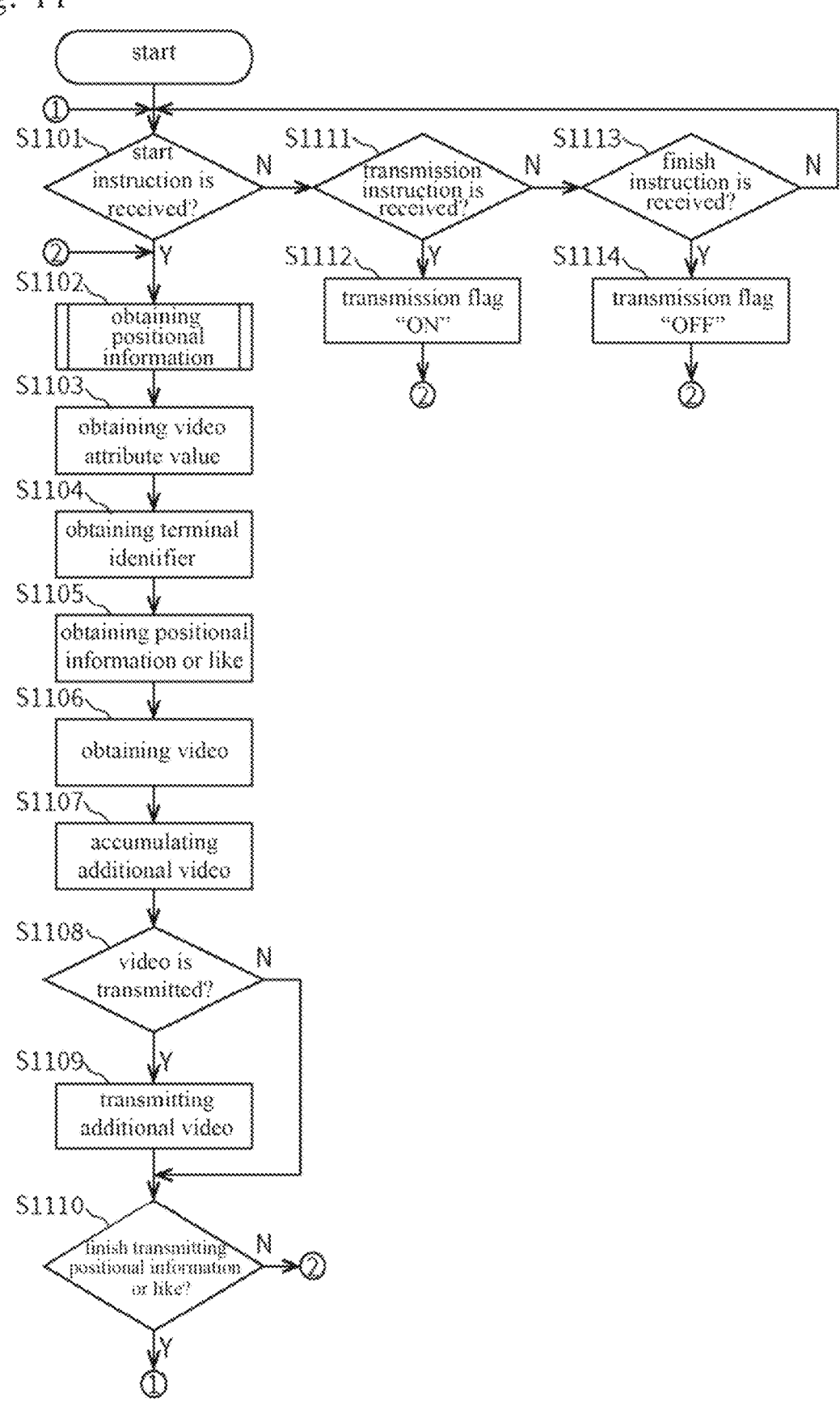
FIG. 11 is a flowchart for explaining an operation example of a mobile terminal 2 in the first embodiment.

In the flowchart in FIG. 11, the process ends when the power is turned off or the instruction of ending process is interrupted.

Figure 12:
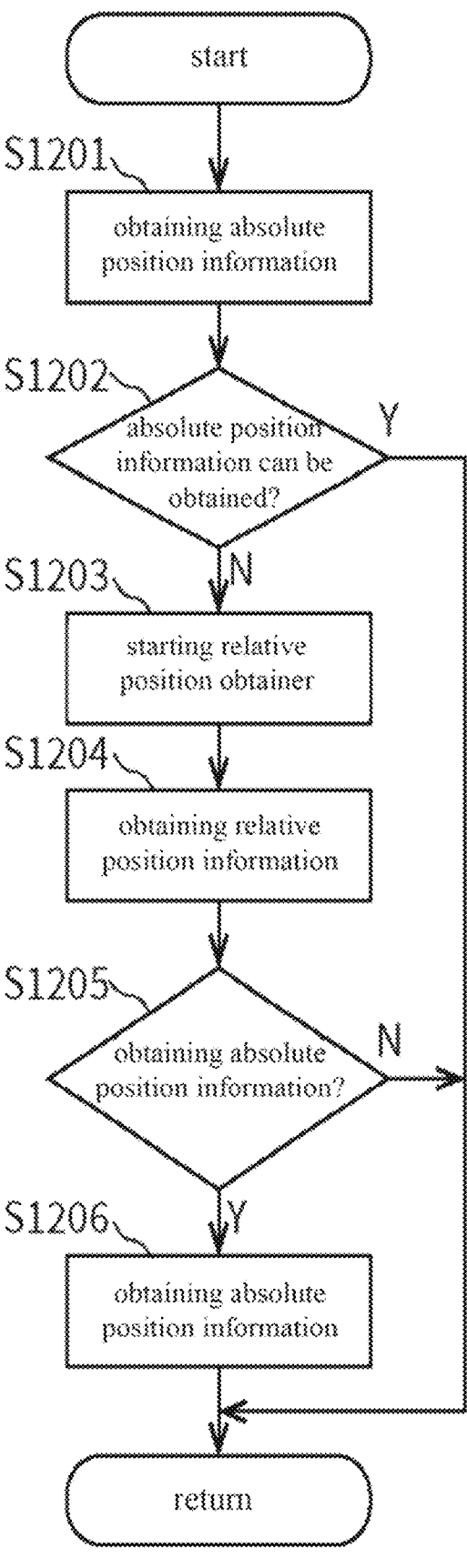
FIG. 12 is a flowchart for explaining an example of a position obtaining process in the first embodiment.

Then, an example of the position obtaining process in S1102 will be explained using the flowchart in FIG. 12.

(S1201) The absolute position obtainer 2311 tries to obtain the absolute position information and accumulate the absolute position information in a not-illustrated buffer.

(S1202) The position obtainer 231 determines whether or not the absolute position information can be obtained in S1201. When the absolute position information can be obtained, the processing returns to the upstream process. When the absolute position information cannot be obtained, the processing proceeds to S1203. When the absolute position information can be obtained in S1201 and the relative position obtainer 2312 is started, it is preferred that the mobile processor 23 stops the process of the relative position obtainer 2312.

(S1203) The position obtainer 231 starts the relative position obtainer 2312. When the relative position obtainer 2312 has been already started, the position obtainer 231 does not perform any operation here.

(S1204) The relative position obtainer 2312 obtains relative position information and accumulates the relative position information in a not-illustrated buffer.

(S1205) The position obtainer 231 determines whether or not to obtain the absolute position information using the relative position information obtained in S1204. When the absolute position information will be obtained, the processing proceeds to S1206. When the absolute position information will not be obtained, the processing returns to the upstream process. Note that the case when the absolute position information will be obtained is, for example, the case when the absolute position information, which is the reference of the relative position information, exists in the mobile storage 21 or a not-illustrated buffer.

(S1206) The position obtainer 231 obtains the reference absolute position information, calculates the absolute position information corresponding to the relative position information using the reference absolute position information and the obtained relative position information, and accumulates the calculated absolute position information in a not-illustrated buffer. The processing returns to the upstream process.

Then, an operation example of the user terminal 3 will be explained using the flowchart in FIG. 13.

(S1301) The user acceptor 32 determines whether or not the inquiry is received. When the inquiry is received, the processing proceeds to S1302. When the inquiry is not received, the processing proceeds to S1307. Note that the reception of the inquiry is, for example, the reception of the user input. The reception of the inquiry is, for example, the input of the instruction by the user at a predetermined location on an indoor map outputted to the mobile terminal 2.

(S1302) The user processor 33 generates the inquiry to be transmitted. Then, the user transmitter 34 transmits the inquiry to the information processing device 1 while being associated with the user identifier.

(S1303) The user receiver 35 determines whether or not the information is received from the information processing device 1. When the information is received, the processing proceeds to S1304. When the information is not received, the processing returns to S1303.

(S1304) The user processor 33 determines whether or not the video is included in the information received in S1303. When the video is included, the processing proceeds to S1305. When the video is not included, the processing proceeds to S1306.

(S1305) The user output unit 36 outputs the received video. The processing returns to S1301.

(S1306) The user output unit 36 outputs the other received information. The processing returns to S1301.

(S1307) The user acceptor 32 determines whether or not the purchase instruction is accepted from the user. When the purchase instruction is accepted, the processing proceeds to S1308. When the purchase instruction is not accepted, the processing returns to S1301. Note that the purchase instruction includes, for example, the inquiry.

(S1308) The user processor 33 generates the purchase instruction to be transmitted. Then, the user transmitter 34 transmits the purchase instruction to the information processing device 1 while being associated with the user identifier.

(S1309) The user receiver 35 determines whether or not the information is received from the information processing device 1. When the information is received, the processing proceeds to S1310. When the information is not received, the processing returns to S1309. Note that the information is, for example, the video, the information indicating the fact that the transfer of the right holder is finished, or the attribute value set of the video.

(S1310) The user processor 33 generates the information to be outputted using the received information. The user output unit 36 outputs the information. The processing returns to S1301.

Figure 13:
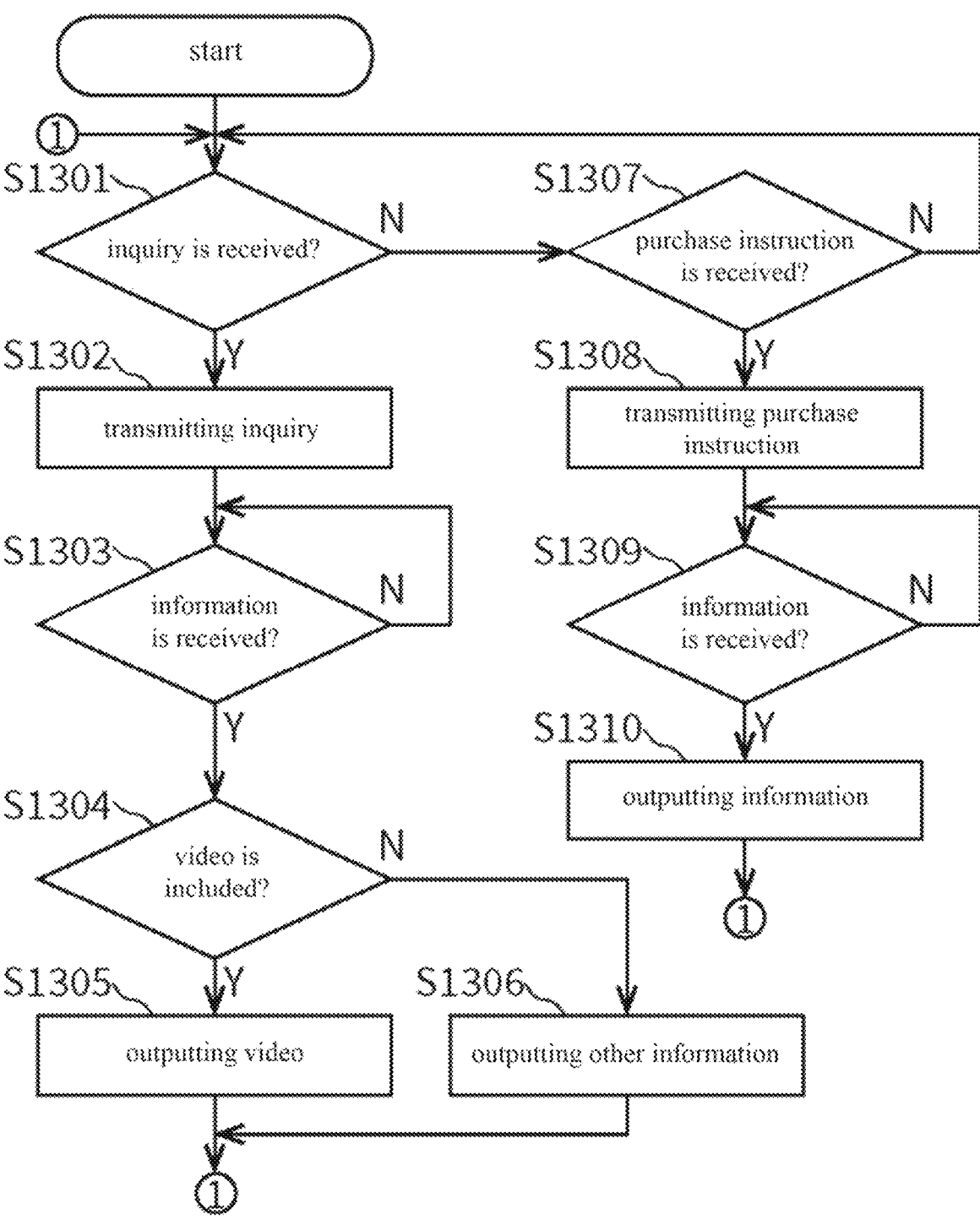
FIG. 13 is a flowchart for explaining an operation example of a user terminal 3 in the first embodiment.

In the flowchart in FIG. 13, the process ends when the power is turned off or the instruction of ending process is interrupted.

SPECIFIC EXAMPLES

Hereafter, specific examples of the operation of the information system A in the present embodiment will be explained.

A terminal management table having the configuration shown in FIG. 14 is currently stored in the terminal manager 111 of the information processing device 1. The terminal management table is the table for managing the terminal information. The terminal management table manages one or more records including "ID," "terminal identifier," "positional information" and "terminal communication information." The "positional information" includes "area identifier" and "detailed position." The "area identifier" is the identifier of the area corresponding to the relative position information. When the area identifier is "-," the "detailed position" is the absolute position information. When the area identifier is the information other than "-," the "detailed position" is the relative position information. The "terminal communication information" is the information used when communicating with the mobile terminal 2.

A large number of mobile terminals 2 capturing videos continuously transmit the latest positional information to the information processing device 1 by the following operations.

Namely, the GPS receiver included in the absolute position obtainer 2311 of the mobile terminal 2 tries to obtain the absolute position information and accumulate the absolute position information in a not-illustrated buffer. Then, the position obtainer 231 determines whether or not the absolute position information can be obtained. When the absolute position information cannot be obtained, the relative position obtainer 2312 is started. Then, a communication module included in the relative position obtainer 2312 receives the area identifier from the signal transmitter located in the area. In addition, LiDAR included in the relative position obtainer 2312 obtains the relative position information in the area. Then, the position obtainer 231 generates the positional information including the area identifier and the relative position information. When the absolute position obtainer 2311 of the mobile terminal 2 can obtain the absolute position information of the mobile terminal 2, the relative position obtainer 2312 is not started. The position obtainer 231 repeats the above described process of obtaining the positional information.

Then, the position transmitter 241 of the mobile terminal 2 continuously transmits the latest positional information to the information processing device 1 while being associated with the terminal identifier.

Then, the position receiver 121 of the information processing device 1 continuously receives the latest positional information associated with the terminal identifier from a large number of mobile terminals 2. Then, the position accumulator 131 accumulates the positional information in the terminal management table while being associated with the terminal identifier. Through the above described process, the terminal management table manages the latest positional information of a large number of mobile terminals 2. In the above described situation, the following two specific examples will be explained.

Specific Example 1

It is assumed that the user inputs the inquiry "<area identifier> underground mall A relative position information (xa, ya)" in the user terminal 3. Note that the above described input is performed, for example, by instructing one location in an underground map of the underground mall A displayed on the user terminal 3.

Then, the user acceptor 32 of the user terminal 3 accepts the inquiry "<area identifier> underground mall A relative position information (xa, ya)." Then, the user processor 33 generates the inquiry to be transmitted. Then, the user transmitter 34 transmits the inquiry to the information processing device 1 while being associated with the user identifier.

Then, the inquiry receiver 122 of the information processing device 1 receives the inquiry from the user terminal 3. Then, the terminal determination unit 132 refers to the terminal management table (FIG. 14) and determines the mobile terminal 2 satisfying the approximate condition with respect to the location identification information "<area identifier> underground mall A relative position information (xa, ya)" included in the inquiry. Namely, the terminal determination unit 132 determines that the area identifier "underground mall A" is satisfied and the detailed position (x1, y1) satisfies the approximate condition which is the condition that the distance from the relative position information (xa, ya) is within a threshold value. Then, the terminal determination unit 132 obtains the terminal communication information "destination 1" from the terminal management table (FIG. 14). It is assumed that the terminal determination unit 132 determines that the area identifier "underground mall A" is satisfied but the detailed position (x2, y2) does not satisfy the approximate condition since the distance from the relative position information (xa, ya) is longer than the threshold value. Namely, the terminal determination unit 132 does not obtain the terminal communication information "destination 2" from the terminal management table (FIG. 14).

Then, the video obtainer 133 transmits the transmission instruction of the video to the mobile terminal 2 having the terminal identifier "T001" communicable using the terminal communication information "destination 1."

Then, the mobile instruction receiver 221 of the mobile terminal 2 receives the transmission instruction of the video from the information processing device 1. Then, the position obtainer 231 performs the position obtaining process. In addition, the attribute value obtainer 233 obtains one or more video attribute values (e.g., time, temperature). In addition, the generator 234 obtains the terminal identifier from the mobile storage 21. The generator 234 generates the information to be transmitted, the information including the positional information, one or more video attribute values and the terminal identifier. The position transmitter 241 transmits the generated information to the information processing device 1. The generator 234 generates the additional video including the video, the positional information, one or more video attribute values and the terminal identifier. The generator 234 accumulates the additional video in the mobile storage 21. The mobile video transmitter 242 transmits the additional video to the information processing device 1. The above described transmission of the video is continued longer than a predetermined time period.

Then, the receiver 12 of the information processing device 1 receives the additional video from the mobile terminal 2. Then, the video generator 134 arranges the obtained videos in the buffer for transmitting the videos. The video transmitter 141 transmits the videos in the buffer to the user terminal 3 from which the inquiry is transmitted. The above described transmission of the video is continued longer than a predetermined time period.

Then, the user terminal 3 receives the video from the information processing device 1 and outputs the video. The above described output of the video is continued longer than a predetermined time period. Through the above described operation, the user can view the video at a predetermined location (e.g. store user wants to visit) in the underground mall A. For example, the user can check whether or not there is a queue in front of the store by viewing the video.

It is assumed that the mobile terminal 2 moves and the terminal determination unit 132 determines that the positional information of the mobile terminal 2 does not satisfy the approximate condition with respect to the location identification information included in the inquiry of the user.

Then, the right holder processor 135 performs the preservation process explained using the flowchart in FIG. 8. Through the above described operation, the user of the user terminal 3 transmitting the video can obtain the reward. In addition, the video is appropriately preserved.

Then, it is assumed that the user terminal 3 identified by the terminal identifier "T002" moves and the positional information of the user terminal 3 satisfies the approximate condition with respect to the location identification information included in the inquiry.

The terminal determination unit 132 of the information processing device 1 determines that the area identifier "underground mall A" is satisfied and the detailed position satisfies the approximate condition since the distance from the relative position information (xa, ya) is within the threshold value in the latest positional information paired with the terminal identifier "T002." Then, the terminal determination unit 132 obtains the terminal communication information "destination 2" from the terminal management table (FIG. 14).

Then, the video obtainer 133 transmits the transmission instruction of the video to the mobile terminal 2 having the terminal identifier "T002" communicable by using the terminal communication information "destination 2."

Then, the mobile instruction receiver 221 of the mobile terminal 2 receives the transmission instruction of the video from the information processing device 1. Then, the position obtainer 231 performs the position obtaining process. In addition, the attribute value obtainer 233 obtains one or more video attribute values (e.g., time, temperature). In addition, the generator 234 obtains the terminal identifier from the mobile storage 21. The generator 234 generates the information to be transmitted, the information including the positional information, one or more video attribute values and the terminal identifier. The position transmitter 241 transmits the generated information to the information processing device 1. The generator 234 generates the additional video including the video, the positional information, one or more video attribute values and the terminal identifier. The generator 234 accumulates the additional video in the mobile storage 21. The mobile video transmitter 242 transmits the additional video to the information processing device 1. The above described transmission of the video is continued longer than a predetermined time period.

Then, the receiver 12 of the information processing device 1 receives the additional video from the mobile terminal 2. Then, the video generator 134 arranges the obtained videos in the buffer for transmitting the videos. The video transmitter 141 transmits the videos in the buffer to the user terminal 3 from which the inquiry is transmitted. The above described transmission of the video is continued longer than a predetermined time period.

Then, the user terminal 3 receives the video from the information processing device 1 and outputs the video. The above described output of the video is continued longer than a predetermined time period. Through the above described operation, the user can sequentially view the videos transmitted from a plurality of mobile terminals 2. For example, the user can know the situation in front of the store for a long time by viewing the videos.

As described above, in the present embodiment, it is possible to provide the mobile terminal capturing the videos utilized appropriately while moving in the indoor environment.

In the present embodiment, it is also possible to provide a platform for appropriately using the videos captured by the mobile terminal moving in the indoor environment.

Note that the processes of each device in the present embodiment may be implemented with software. The software may be distributed by, for example, downloading the software. The software may be recorded in a recording medium such as a compact disk read-only memory (CD-ROM) for distribution. The same applies to another embodiment herein.

Second Embodiment

Outline of Second Embodiment

In the first embodiment, the mobile terminal 2 capable of transmitting the video satisfying the inquiry of the user is determined by the information processing device 1. In the present embodiment, whether or not to transmit the video is determined by the mobile terminal with respect to the inquiry of the user.

<Outline of Information System A>

The schematic diagram of the information system B of the present embodiment is same as FIG. 1 except for the reference numerals.

Figure 15:
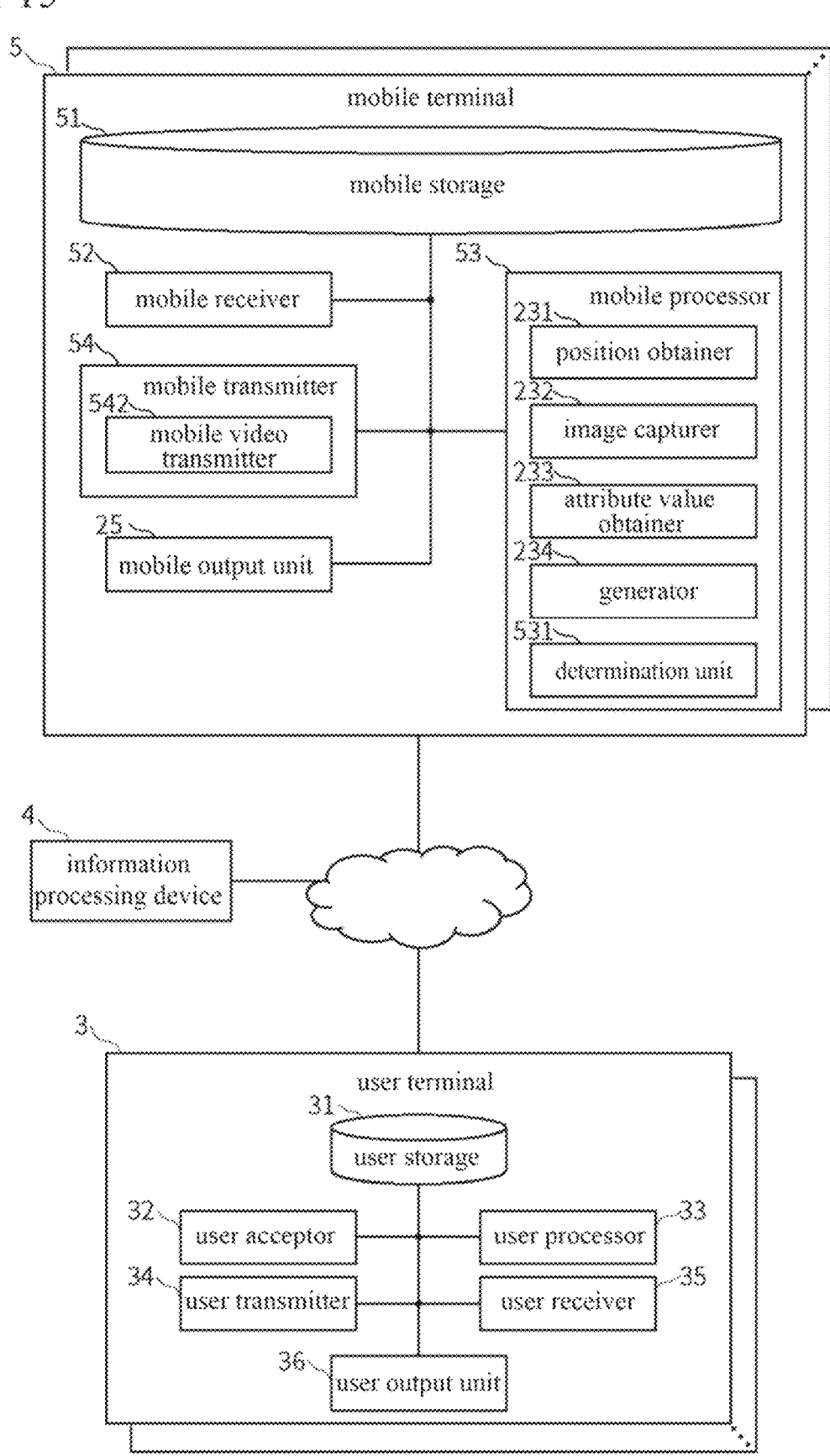
FIG. 15 is a block diagram of an information system B in the second embodiment.
Figure 16:
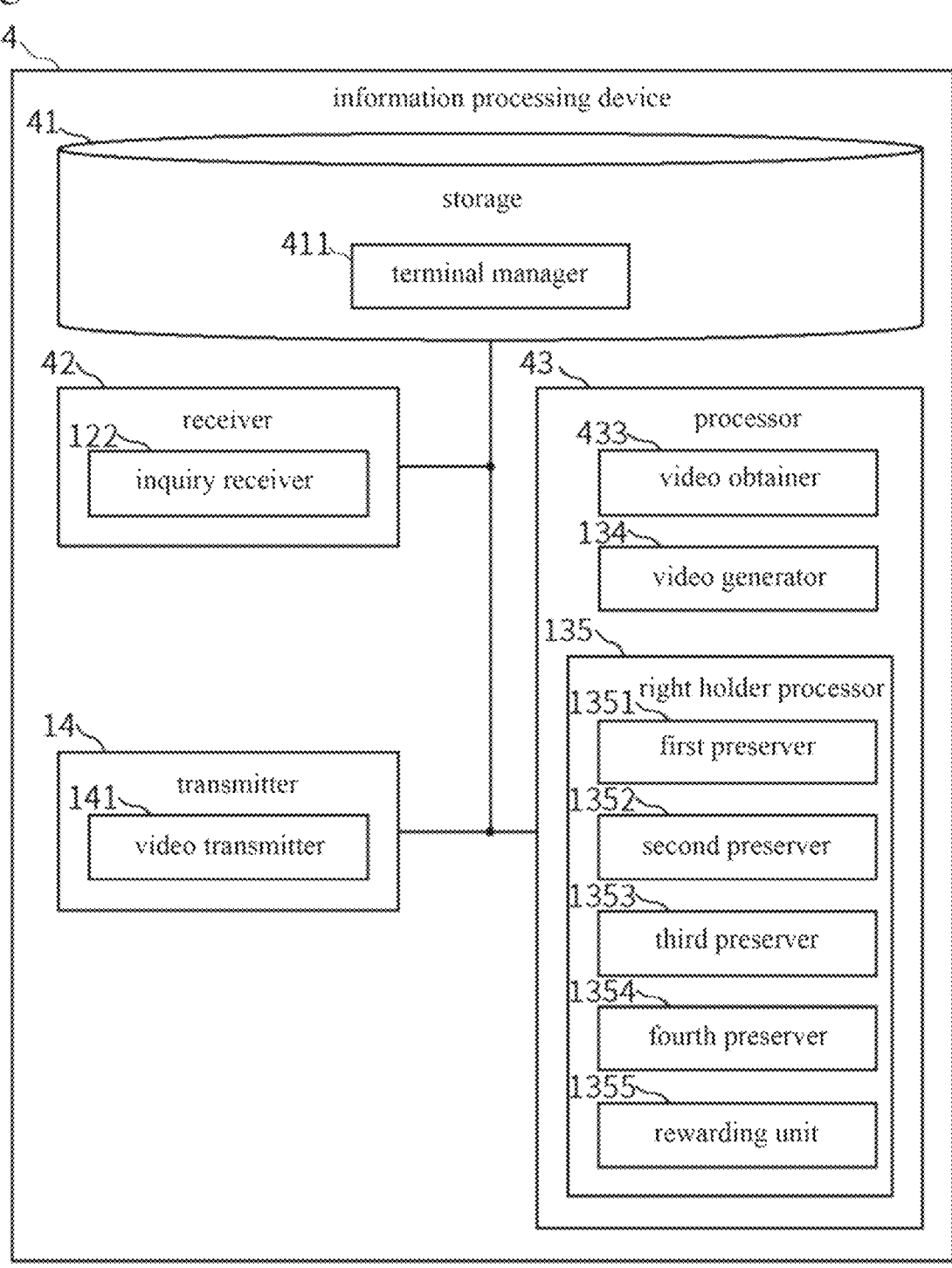
FIG. 16 is a block diagram of an information processing device 4 in the second embodiment.

FIG. 15 is a block diagram of an information system B in the present embodiment. FIG. 16 is a block diagram of an information processing device 4.

The information system B includes the information processing device 4, one or a plurality of mobile terminals 5 and one or a plurality of user terminals 3.

The information processing device 4 is the server for providing the videos transmitted from each of one or a plurality of mobile terminals 5 to the user terminals 3. The information processing device 4 is, for example, a so-called server such as a cloud server or an application service provider (ASP) server. The type of the information processing device 4 is not limited. The information processing device 4 may be a device included in a blockchain.

The mobile terminal 5 is the terminal installed in a movable body to capture videos. The mobile terminal 5 is, for example, a smartphone, a tablet terminal, a camera with a communication function, a glasses with a camera and a smartwatch with a camera.

The information processing device 4 and each of one or more mobile terminals 5 can generally communicate with each other through a network such as the Internet. The information processing device 4 and each of one or more user terminals 3 can generally communicate with each other through a network such as the Internet.

The information processing device 4 includes a storage 41, a receiver 42, a processor 43 and a transmitter 14. The storage 41 includes a terminal manager 411. The receiver 42 includes an inquiry receiver 122. The processor 43 includes a video obtainer 433, a video generator 134 and a right holder processor 135.

The mobile terminal 5 includes a mobile storage 21, a mobile receiver 52, a mobile processor 53, a mobile transmitter 54 and a mobile output unit 25. The mobile processor 53 includes a position obtainer 231, an image capturer 232, an attribute value obtainer 233, a generator 234 and a mobile determination unit 531. The mobile transmitter 54 includes a mobile video transmitter 542.

<Detail of Components of Information Processing Device 4>

The storage 41 stores various kinds of information. The various kinds of information are, for example, the later described terminal information, the video and the video associate value associated with the video.

The terminal manager 411 stores one or a plurality of terminal information. The terminal information is associated with the mobile terminal 5. The terminal information is the information related to the mobile terminal 5. The terminal information here normally includes the terminal identifier which is the identifier of the mobile terminal 2 and the terminal communication information.

The receiver 42 receives various kinds of information and instructions from the mobile terminal 2 or the user terminal 3. The various kinds of information and instructions are, for example, the inquiry, the video and the additional video.

The processor 43 performs various kinds of processes. For example, the various kinds of processes are performed by the video obtainer 433, the video generator 134 and the right holder processor 135.

The video obtainer 433 obtains the video transmitted from the mobile terminal 5 moving indoors, the video satisfying the inquiry.

The video obtainer 433 normally receives the video from the mobile terminal 5 when the inquiry is received. For example, the video obtainer 433 receives the video captured by each of a plurality of mobile terminals 5 from the mobile terminal 5. The mobile terminal 5 capturing the video is the mobile terminal 5 corresponding to the positional information satisfying the inquiry.

<Detail of Components of Mobile Terminal 5>

The mobile receiver 52 receives various kinds of information. The various kinds of information are, for example, the inquiry. The mobile instruction receiver 221 receives the inquiry from the information processing device 1.

The mobile processor 53 performs various kinds of processes. For example, the various kinds of processes are performed by the position obtainer 231, the image capturer 232, the attribute value obtainer 233, the generator 234 and the mobile determination unit 531.

The mobile determination unit 531 determines whether or not the positional information received by the position obtainer 231 satisfies the inquiry received by the mobile receiver 52. More specifically, the mobile determination unit 531 determines whether or not the positional information obtained by the position obtainer 231 satisfies the approximate condition with respect to the location identification information included in the inquiry received by the mobile receiver 52. Note that the positional information obtained by the position obtainer 231 is, for example, the relative position information or the absolute position information obtained by using the relative position information.

The mobile transmitter 54 transmits various kinds of information to the information processing device 1. The various kinds of information are, for example, the attribute value set, the video and the additional video.

The mobile video transmitter 542 transmits the video when the mobile determination unit 531 determines that the inquiry is satisfied. Note that the video here may be the additional video.

The storage 41 and the terminal manager 411 are preferably a nonvolatile recording medium. However, these storages may be a volatile recording medium.

The process of storing the information in the storage 41 or the like is not limited. For example, the information may be stored in the storage 41 or the like via a recording medium, the information transmitted via a communication line or the like may be stored in the storage 41 or the like, or the information inputted by an input device may be stored in the storage 41 or the like.

The receiver 42 and the mobile receiver 52 are normally implemented by a wireless or wired communication means. However, these receivers may be implemented by a means for receiving a broadcast.

The processor 43, the mobile processor 53 and the mobile determination unit 531 may normally be implemented by a processor, a memory or the like. The processing procedure of the processor 43 or the like is normally implemented by a software and the software is stored in a recording medium such as a read-only memory (ROM). However, the processing procedure may be implemented by a hardware (dedicated circuit). Note that the processor is a central processing unit (CPU), a microprocessor unit (MPU), a graphical processing unit (GPU) or the like. The type of the processor is not limited.

The video obtainer 433 is normally implemented by a wireless or wired communication means. However, the video obtainer 433 may be implemented by a means for receiving a broadcast.

The mobile transmitter 54 and the mobile video transmitter 542 are normally implemented by a wireless or wired communication means. However, these transmitters may be implemented by a broadcast means.

<Operations>

Then, an operation example of the information system B will be explained. First, an operation example of the information processing device 4 will be explained using the flowchart in FIG. 17. In the flowchart in FIG. 17, the explanation of the same steps as the steps in the flowchart in FIG. 4 is omitted.

(S1701) The inquiry receiver 122 determines whether or not the inquiry is received from the user terminal 3. When the inquiry is received, the processing proceeds to S1702. When the inquiry is not received, the processing returns to S1701.

(S1702) The video obtainer 433 substitutes 1 for a counter i.

(S1703) The video obtainer 433 determines whether or not the i-th terminal information exists in the terminal manager 411. When the i-th terminal information exists, the processing proceeds to S1704. When the i-th terminal information does not exist, the processing proceeds to S1706. The fact that the terminal information exists is the fact that the mobile terminal 5 that may be capable of transmitting the video exists.

(S1704) The video obtainer 433 transmits the inquiry to the mobile terminal 5 corresponding to the i-th terminal information.

(S1705) The video obtainer 433 increments the counter i by 1. The processing returns to S1703.

(S1706) The receiver 42 determines whether or not the additional video is received from one or a plurality of mobile terminals 5. When the additional video is received, the processing proceeds to S1707. When the additional video is not received, the processing proceeds to S1708.

(S1707) The processor 43 accumulates the received one or more additional videos in a not-illustrated buffer. The processing returns to S1706.

(S1708) The processor 43 determines whether or not a timeout has occurred. When the timeout has occurred, the processing proceeds to S1709. When the timeout has not occurred, the processing returns to S1706. Note that the timeout is the fact that more than a threshold time has elapsed since the transmission. The threshold time is the time for waiting the reception of the video.

(S1709) The receiver 42 determines whether or not the additional video is received from one or a plurality of mobile terminals 5. Before the timeout occurs, when the additional video is received, the processing proceeds to S410. When the additional video is not received, the processing proceeds to S1710.

(S1710) The transmitter 14 transmits an error message to the user terminal 3. Note that the error message is the information indicating that the video corresponding to the inquiry cannot be retrieved.

Figure 17:
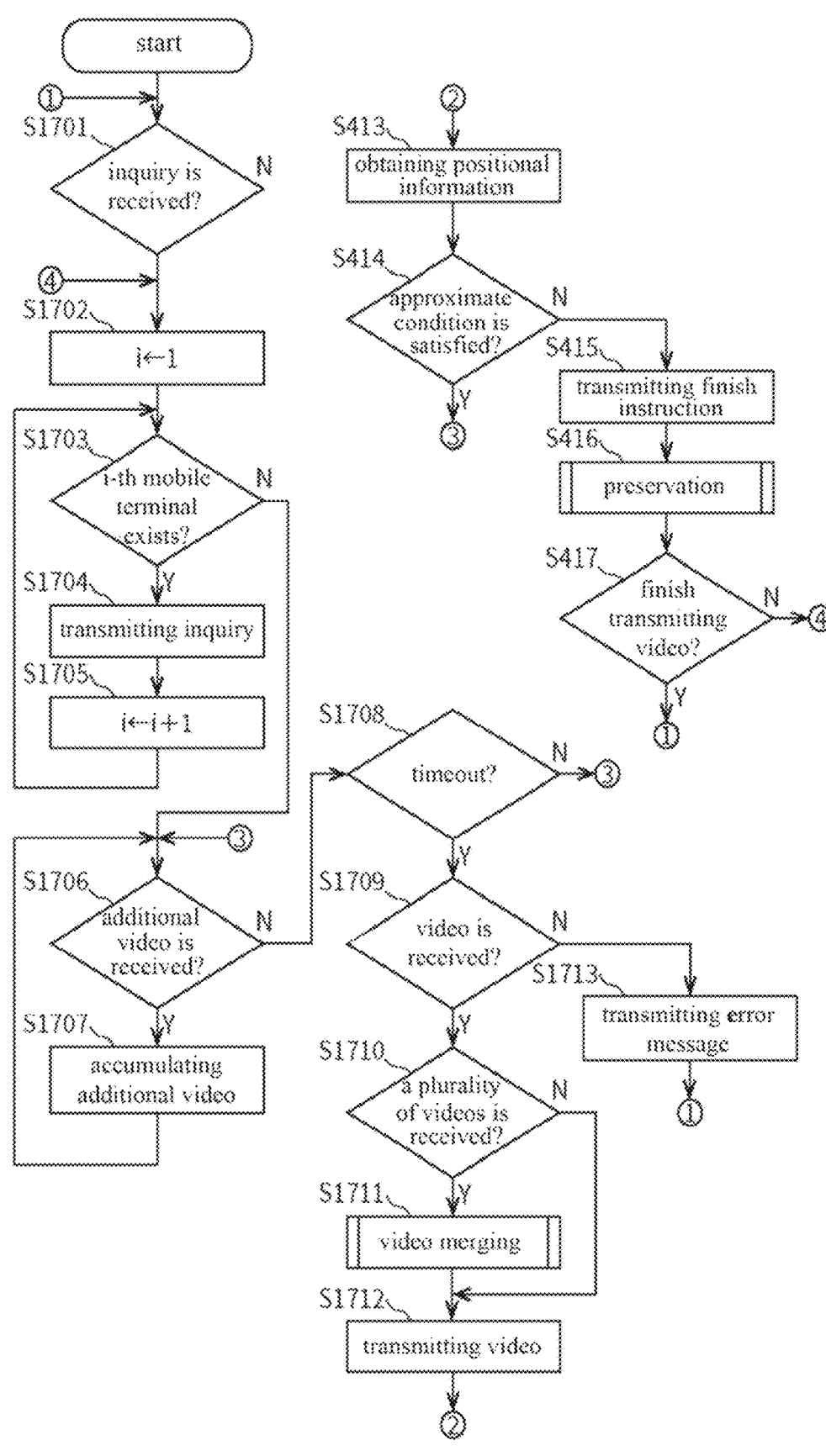
FIG. 17 is a flowchart for explaining an operation example of the information processing device 4 in the second embodiment.

In the flowchart in FIG. 17, the process ends when the power is turned off or the instruction of ending process is interrupted.

Then, an operation example of the mobile terminal 5 will be explained using the flowchart in FIG. 18. In the flowchart in FIG. 18, the explanation of the same steps as the steps in the flowchart in FIG. 11 is omitted.

(S1801) The mobile receiver 52 determines whether or not the inquiry is received from the information processing device 4. When the inquiry is received, the processing proceeds to S1102. When the inquiry is not received, the processing returns to S1101.

(S1802) The position obtainer 231 obtains the positional information. An example of the above described position obtaining process will be explained using the flowchart in FIG. 12.

(S1803) The mobile determination unit 531 obtains the location identification information included in the inquiry.

(S1804) The mobile determination unit 531 determines whether or not the approximate condition is satisfied between the positional information obtained in S1802 and the location identification information obtained in S1803. When the approximate condition is satisfied, the processing proceeds to S1102. When the approximate condition is not satisfied, the processing proceeds to S1101.

(S1805) The mobile processor 53 determines whether or not the process will be finished. When the process will be finished, the processing returns to S1101. When the process will not be finished, the processing returns to S1102.

Figure 18:
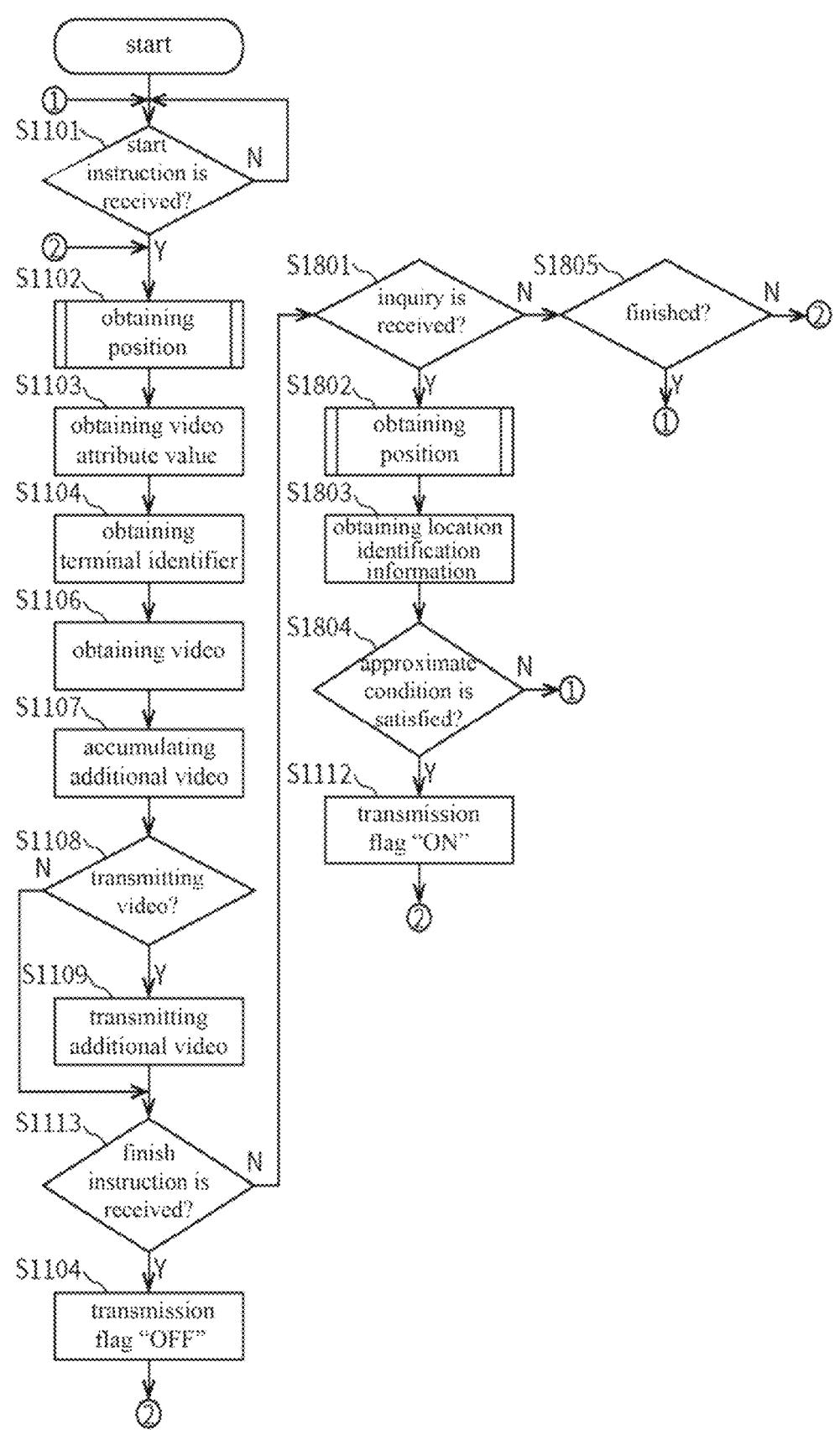
FIG. 18 is a flowchart for explaining an operation example of a mobile terminal 5 in the second embodiment.

In the flowchart in FIG. 18, the process ends when the power is turned off or the instruction of ending process is interrupted.

SPECIFIC EXAMPLES

Hereafter, a specific operation example of the information system B in the present embodiment will be explained.

The terminal manager 411 of the information processing device 4 currently stores the terminal management table having the properties including "ID," "terminal identifier" and "terminal communication information" in the terminal management table shown in FIG. 14.

In the above described situation, it is assumed that the user inputs the inquiry "<area identifier> underground mall A relative position information (xa, ya)" in the user terminal 3.

Then, the user acceptor 32 of the user terminal 3 accepts the inquiry "<area identifier> underground mall A relative position information (xa, ya)." Then, the user processor 33 generates the inquiry to be transmitted. Then, the user transmitter 34 transmits the inquiry to the information processing device 1 while being associated with the user identifier.

Then, the inquiry receiver 122 of the information processing device 1 receives the inquiry from the user terminal 3. Then, the video obtainer 433 transmits the inquiry to a large number of mobile terminals 5 in the terminal management table (FIG. 14).

Then, the mobile receiver 52 of each of the mobile terminals 5 receives the inquiry from the information processing device 4. Then, the position obtainer 231 of each of the mobile terminals 5 obtains the positional information by the operation explained using the flowchart in FIG. 12.

Then, the mobile determination unit 531 of each of the mobile terminals 5 obtains the location identification information included in the inquiry. In addition, the mobile determination unit 531 determines whether or not the approximate condition is satisfied between the obtained positional information and the obtained location identification information.

Then, the position obtainer 231 of the mobile terminal 5 satisfying the approximate condition performs the position obtaining process. In addition, the attribute value obtainer 233 of the mobile terminal 5 obtains one or more video attribute values (e.g., time, temperature). In addition, the generator 234 of the mobile terminal 5 obtains the terminal identifier from the mobile storage 21. The generator 234 of the mobile terminal 5 generates the information to be transmitted, the information including the positional information, one or more video attribute values and the terminal identifier. The generator 234 generates the additional video including the video, the positional information, one or more video attribute values and the terminal identifier. The generator 234 accumulates the additional video in the mobile storage 21. In addition, the mobile video transmitter 542 of the mobile terminal 5 transmits the additional video to the information processing device 1. The above described transmission of the video is continued longer than a predetermined time period.

Then, the receiver 12 of the information processing device 1 receives the additional video from the mobile terminal 2. Then, the video generator 134 arranges the obtained video in the buffer transmitting the video. The video transmitter 141 transmits the video in the buffer to the user terminal 3 from which the inquiry is transmitted. The above described transmission of the video is continued longer than a predetermined time period.

Then, the user terminal 3 receives the video from the information processing device 1 and outputs the video. The above described output of the video is continued longer than a predetermined time period. Through the above described operation, the user can view the video at a predetermined location (e.g. store user wants to visit) in the underground mall A. For example, the user can check whether or not there is a queue in front of the store by viewing the video.

It is assumed that the mobile terminal 5 moves and the mobile determination unit 531 determines that the positional information of the mobile terminal 5 does not satisfy the approximate condition with respect to the location identification information included in the inquiry. Then, the mobile terminal 5 stops transmitting the video.

Then, when another mobile terminal 5 moves and the mobile determination unit 531 determines that the approximate condition is satisfied, the position obtainer 231 of the mobile terminal 5 performs the position obtaining process. In addition, the attribute value obtainer 233 of the mobile terminal 5 obtains one or more video attribute values (e.g., time, temperature). In addition, the generator 234 of the mobile terminal 5 obtains the terminal identifier from the mobile storage 21. The generator 234 of the mobile terminal 5 generates the information to be transmitted, the information including the positional information, one or more video attribute values and the terminal identifier. The generator 234 generates the additional video including the video, the positional information, one or more video attribute values and the terminal identifier. The generator 234 accumulates the additional video in the mobile storage 21. In addition, the mobile video transmitter 542 of the mobile terminal 5 transmits the additional video to the information processing device 1. The above described transmission of the video is continued longer than a predetermined time period.

Then, the receiver 12 of the information processing device 1 receives the additional video from the mobile terminal 2. Then, the video generator 134 arranges the obtained videos in the buffer for transmitting the videos. The video transmitter 141 transmits the videos in the buffer to the user terminal 3 from which the inquiry is transmitted. The above described transmission of the video is continued longer than a predetermined time period.

Then, the user terminal 3 receives the video from the information processing device 1 and outputs the video. The above described output of the video is continued longer than a predetermined time period. Through the above described operation, the user can view the video at a predetermined location in the underground mall A for a long time.

Specific Example 2

It is assumed that another user than the user of the specific example 1 inputs the inquiry "<area identifier> building B<location name> store S" in the user terminal 3 of the user.

Then, the user acceptor 32 of the user terminal 3 receives the inquiry "<area identifier> building B<location name> store S." Then, the user processor 33 generates the inquiry to be transmitted. Then, the user transmitter 34 transmits the inquiry to the information processing device 1 while being associated with the user identifier.

Then, the inquiry receiver 122 of the information processing device 1 receives the inquiry from the user terminal 3. Then, it is assumed that the terminal determination unit 132 refers to a not-illustrated location name database and obtains the relative position information (xS, yS) paired with "<area identifier> building B<location name> store S."

Then, the terminal determination unit 132 refers to the terminal management table (FIG. 14) and determines the mobile terminal 2 satisfying the approximate condition with respect to the location identification information "<area identifier> building B relative position information (xS, yS)" indicated by the inquiry. Namely, the terminal determination unit 132 determines that the area identifier "building B" is satisfied and the detailed position (x4, y4) satisfies the approximate condition since the distance from the relative position information (xS, yS) is within the threshold value. Then, the terminal determination unit 132 obtains the terminal communication information "destination 4" from the terminal management table (FIG. 14). It is assumed that the terminal determination unit 132 determines that the area identifier "building B" is satisfied but the detailed position (x3, y3) does not satisfy the approximate condition since the distance from the relative position information (xS, yS) is longer than the threshold value. Namely, the terminal determination unit 132 does not obtain the terminal communication information "destination 3" from the terminal management table (FIG. 14).

Then, the video obtainer 133 transmits the transmission instruction of the video to the mobile terminal 2 having the terminal identifier "T004" communicable using the terminal communication information "destination 4."

Then, the mobile instruction receiver 221 of the mobile terminal 2 receives the transmission instruction of the video from the information processing device 1. Then, the position obtainer 231 performs the position obtaining process. In addition, the attribute value obtainer 233 obtains one or more video attribute values (e.g., time, temperature). In addition, the generator 234 obtains the terminal identifier from the mobile storage 21. The generator 234 generates the information to be transmitted, the information including the positional information, one or more video attribute values and the terminal identifier. The position transmitter 241 transmits the generated information to the information processing device 1. The generator 234 generates the additional video including the video, the positional information, one or more video attribute values and the terminal identifier. The generator 234 accumulates the additional video in the mobile storage 21. The mobile video transmitter 242 transmits the additional video to the information processing device 1. The above described transmission of the video is continued longer than a predetermined time period.

Then, the receiver 12 of the information processing device 1 receives the additional video from the mobile terminal 2. Then, the video generator 134 arranges the obtained videos in the buffer for transmitting the videos. The video transmitter 141 transmits the videos in the buffer to the user terminal 3 from which the inquiry is transmitted. The above described transmission of the video is continued longer than a predetermined time period.

Then, the user terminal 3 receives the video from the information processing device 1 and outputs the video. The above described output of the video is continued longer than a predetermined time period. Through the above described operation, the user can view the video around the store S of the building B. For example, the user can check whether or not there is a queue in front of the store S by viewing the video.

As described above, in the present embodiment, it is possible to provide the mobile terminal capturing the videos utilized appropriately while moving in the indoor environment.

In the present embodiment, it is also possible to provide a platform for appropriately utilizing the videos captured by the mobile terminal moving in the indoor environment.

Figure 19:
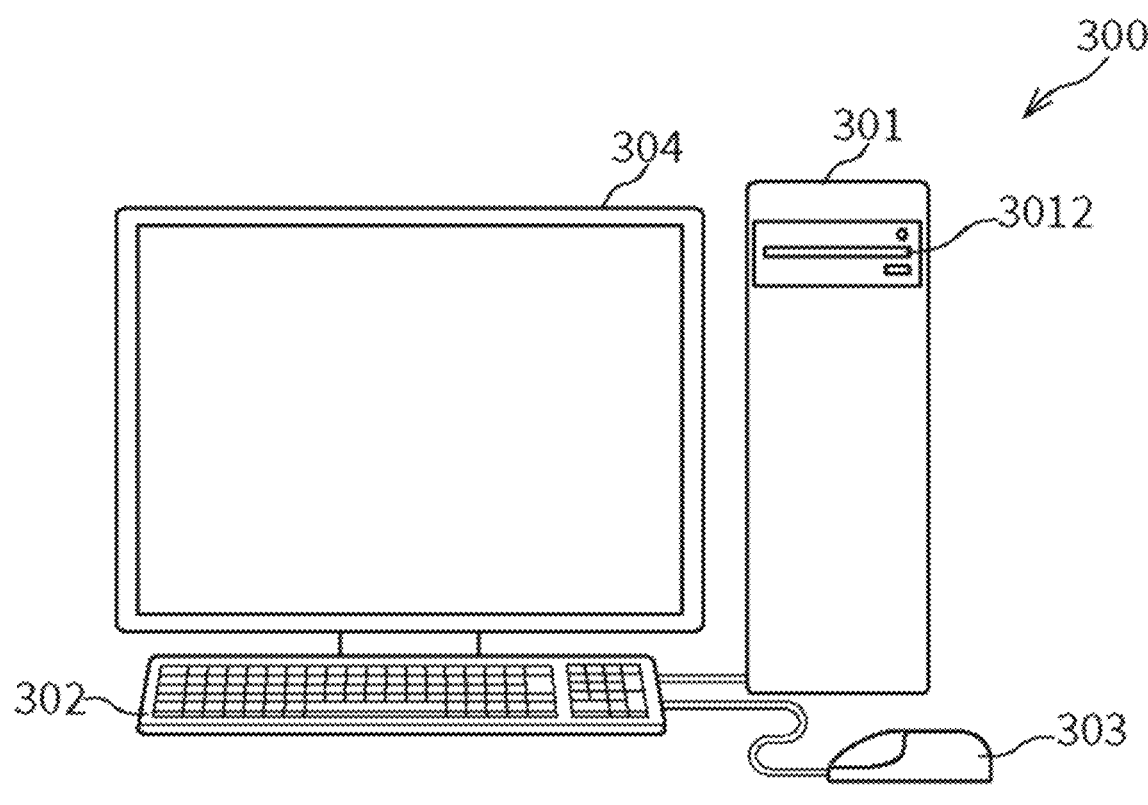
FIG. 19 is a schematic external view of a computer system in the above described embodiments.

FIG. 19 shows the external appearance of a computer that executes the program described in this specification and achieves the information processing device 1, the mobile terminal 2, the user terminal 3, the information processing device 4 and the mobile terminal 5 according to the various kinds of embodiments described above. The above described embodiments can be implemented with computer hardware and a computer program executed on the computer hardware. FIG. 19 is a schematic diagram of a computer system 300 and FIG. 20 is a block diagram of the system 300.

In FIG. 19, the computer system 300 includes a computer 301 including a CD-ROM drive, a keyboard 302, a mouse 303 and a monitor 304.

Figure 20:
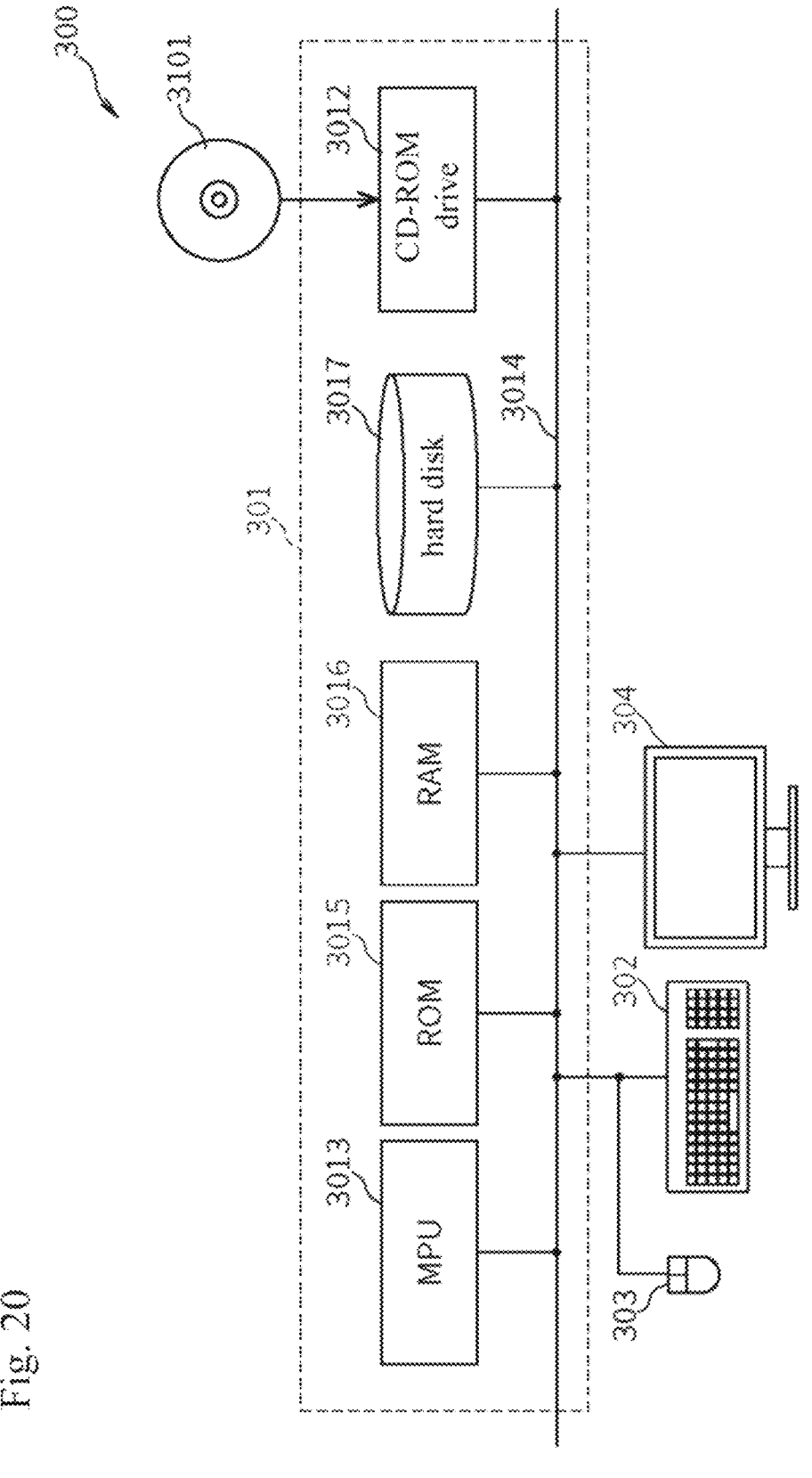
FIG. 20 is a block diagram of the computer system in the above described embodiments.

In FIG. 20, the computer 301 includes a CD-ROM drive 3012, a microprocessor unit (MPU) 3013, a bus 3014 connected to the CD-ROM drive 3012 or the like, a read-only memory (ROM) 3015 storing programs such as a boot-up program, a random access memory (RAM) 3016 connected to the MPU 3013, temporary storing a command from an application program, and a hard disk 3017 storing an application program, a system program and data.

Although not shown in the figure, the computer 301 may further include a network card that allows connection to a local area network (LAN).

A program that causes the computer system 300 to function as, for example, the information processing device 1 according to the above described embodiment may be stored in a CD-ROM 3101, inserted into the CD-ROM drive 3012 and transferred to the hard disk 3017. Alternatively, the program may be transmitted to the computer 301 through a not-illustrated network and stored in the hard disk 3017. The program is loaded on the RAM 3016 when the program is executed. The program may be directly loaded from the CD-ROM 3101 or the network.

It is not necessary for the programs to include, for example, a third party program or an operating system (OS) that causes the computer 301 to function as, for example, the information processing device 1 according to the above described embodiment. The programs may be any program that includes a command to call an appropriate function (module) in a controlled manner and obtain an intended result. The manner in which the computer system 300 operates is conventionally known. Thus, the detailed explanation is omitted.

The steps in the above described program, such as transmitting or receiving information, do not include processing performed by hardware, or for example, processing performed by a modem or an interface card in the transmission step (processing performed by hardware alone).

One or more computers may execute the above described program. Namely, either integrated processing or distributed processing may be performed.

In each of the above described embodiments, a plurality of communicators included in a single device may be implemented by a single physical medium.

In each of the embodiments, each process may be performed by a single device through integrated processing or by multiple devices through distributed processing.

The present invention is not limited to the above embodiments, but may be modified variously within the scope of the present invention.

INDUSTRIAL APPLICABILITY

As explained above, the mobile terminal of the present invention has an effect capable of appropriately using the video captured by the mobile terminal moving in the indoor environment and is effective as a terminal or the like for providing the video.

The invention claimed is:

1. A mobile terminal comprising:

a position obtainer including an absolute position obtainer and an indoor position obtainer, the absolute position obtainer being configured to obtain an absolute position information indicating a current position in an outdoor environment using a GPS receiver, the indoor position obtainer being configured to obtain a relative position information for specifying a relative position indicating the current position in an indoor environment by receiving a signal including an area identifier for identifying a predetermined area in the indoor environment from a signal transmitter installed in the indoor environment when the mobile terminal moves from the outdoor environment to the indoor environment and the absolute position obtainer is unable to obtain the absolute position information;

a mobile inquiry receiver configured to receive an inquiry including a location identification information for specifying a location in the indoor environment from the information processing device, the location identification information including the area identifier and the relative position information;

a mobile determination unit configured to determine whether or not the area identifier and the relative position information obtained by the position obtainer satisfy an approximate condition with respect to the location identification information;

an image capturer configured to capture an image;

an additional image generator configured to obtain an additional image in which the area identifier, the relative position information and one or more camera attribute values including a direction information indicating a direction of capturing the image captured by the image capturer are associated with the image; and a transmitter configured to transmit the additional image satisfying the approximate condition to the information processing device when the mobile determination unit determines that the approximate condition is satisfied.

2. An information processing system comprising:

a plurality of mobile terminal, each of the plurality of mobile terminal being the mobile terminal according to claim 1;

an information processing device; and a user terminal, wherein the transmitter of the mobile terminal is configured to transmit the absolute position information, the area identifier and the relative position information to the information processing device together with a terminal identifier for identifying the mobile terminal, and the information processing device includes:

a receiver configured to receive the absolute position information, the area identifier and the relative position information together with the terminal identifier from the mobile terminal;

a terminal manager configured to store the absolute position information, the area identifier and the relative position information which are received while being associated with the terminal identifier;

an inquiry receiver configured to receive the inquiry from the user terminal;

a determination unit configured to determine whether or not the position indicated by the location identification information satisfies an approximate condition with respect to the position indicated by the relative position information stored in the terminal manager and associated with the terminal identifier;

an inquiry transmitter configured to transmit the inquiry to the mobile terminal identified by the terminal identifier when the determination unit determines that there is one or more terminal identifiers associated with the position satisfying the approximate condition;

an additional image obtainer configured to receive and obtain a plurality of additional images transmitted from the mobile terminal when the inquiry is transmitted;

a generation unit configured to generate one image by combining the obtained plurality of additional images in a time series manner or merging the obtained plurality of additional images in a spatial manner; and a screen transmitter configured to transmit the one image to the user terminal.

3. An information processing method used for a mobile terminal, comprising:

a step of obtaining an absolute position information indicating a current position in an outdoor environment using a GPS receiver, a step of obtaining a relative position information for specifying a relative position indicating the current position in an indoor environment by receiving a signal including an area identifier for identifying a predetermined area in the indoor environment from a signal transmitter installed in the indoor environment when the mobile terminal moves from the outdoor environment to the indoor environment and the absolute position information cannot be obtained in the step of obtaining the absolute position information;

a step of receiving an inquiry including a location identification information for specifying a location in the indoor environment from the information processing device, the location identification information including the area identifier and the relative position information;

a determination step of determining whether or not the obtained area identifier and the obtained relative position information satisfy an approximate condition with respect to the location identification information;

a step of capturing an image;

a step of obtaining an additional image in which the area identifier, the relative position information and one or more camera attribute values including a direction information indicating a direction of capturing the image are associated with the image; and a step of transmitting the additional image satisfying the approximate condition to the information processing device when the mobile determination unit determines that the approximate condition is satisfied in the determination step.

\* \* \* \* \*